(12) United States Patent
Kitagawa et al.

(10) Patent No.: US 7,182,555 B2
(45) Date of Patent: Feb. 27, 2007

(54) INDEXABLE INSERT

(75) Inventors: Yoshihiro Kitagawa, Yuuki-gun (JP);
Kensuke Watanabe, Yuuki-gun (JP);
Osamu Ichinoseki, Yuuki-gun (JP);
Kenji Sugawara, Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/496,233

(22) PCT Filed: Nov. 19, 2002

(86) PCT No.: PCT/JP02/12058

§ 371 (c)(1),
(2), (4) Date: May 19, 2004

(87) PCT Pub. No.: WO03/043767

PCT Pub. Date: May 30, 2003

(65) Prior Publication Data
US 2005/0019111 A1    Jan. 27, 2005

(30) Foreign Application Priority Data
Nov. 20, 2001 (JP) .............................. 2001-354459
Mar. 20, 2002 (JP) .............................. 2002-079717

(51) Int. Cl.
*B23P 15/30* (2006.01)
(52) U.S. Cl. .................... 407/113; 407/115; 407/116
(58) Field of Classification Search ................ 407/113, 407/114, 115, 116
See application file for complete search history.

(56) References Cited

U.S. PATENT DOCUMENTS 3,792,514 A * 2/1974 Ushijima ..................... 407/113

(Continued)

FOREIGN PATENT DOCUMENTS

JP           49-97976 A1     9/1974

(Continued)

OTHER PUBLICATIONS

Patent Abstracts of Japan for JP05-51507 published on Jul. 9, 1993.

(Continued)

*Primary Examiner*—Monica Carter
*Assistant Examiner*—Sara Addisu
(74) *Attorney, Agent, or Firm*—Darby & Darby

(57) ABSTRACT

An object of the invention is to reliably control chip, particularly that produced in profiling. To achieve this, rake faces are formed on polygon faces of an insert in the form of a polygonal plate shape, and a pair of cutting edges extending respectively from corner parts of the polygon faces are formed on a ridge part of the polygon faces, and each of the rake faces is gradually inclined as it becomes farther away from the cutting edge, and a land formed along the cutting edge, is inclined so that it gradually sinks as it become farther away from the cutting edge at an angle of inclination smaller than a rake angle, and angles of inclination of these rake face and land are made smaller in the direction to separate from a tip of the corner part along the cutting edge, and a main convex being a convex spherical face shape is formed at intervals between the cutting edges, on the corner part C, and at least one pair of sub convexes being a convex spherical face shape is also formed respectively at positions away from this main convex, along the pair of cutting edges.

19 Claims, 24 Drawing Sheets

U.S. PATENT DOCUMENTS

| | | | | |
|---|---|---|---|---|
| 3,815,192 A | * | 6/1974 | Ohtsu et al. | 407/114 |
| 4,214,845 A | * | 7/1980 | Mori | 407/114 |
| 4,318,645 A | * | 3/1982 | McCreery | 407/114 |
| 4,487,534 A | * | 12/1984 | Reiter | 407/114 |
| 4,941,780 A | * | 7/1990 | Takahashi | 407/114 |
| 5,046,899 A | * | 9/1991 | Nishi | 407/102 |
| 5,116,167 A | * | 5/1992 | Niebauer | 407/114 |
| 5,192,171 A | * | 3/1993 | Ther et al. | 407/114 |
| 5,193,947 A | * | 3/1993 | Bernadic et al. | 407/114 |
| 5,282,703 A | * | 2/1994 | Itaba et al. | 407/114 |
| 5,449,255 A | * | 9/1995 | Katbi et al. | 407/114 |
| 5,476,025 A | * | 12/1995 | Beeghly et al. | 82/1.11 |
| 5,476,346 A | | 12/1995 | Lundstrom | |
| 5,746,346 A | | 5/1998 | Crilly | |
| 5,788,427 A | * | 8/1998 | Zitzlaff et al. | 407/114 |

FOREIGN PATENT DOCUMENTS

| | | | |
|---|---|---|---|
| JP | 55-37205 | A1 | 3/1980 |
| JP | 62-181805 | A1 | 8/1987 |
| JP | 4-115506 | U | 10/1992 |
| JP | 5-51507 | U | 7/1993 |
| JP | 06-55312 | A1 | 3/1994 |
| JP | 7-15206 | U | 3/1995 |
| JP | 09-38807 | A1 | 2/1997 |
| JP | 2000-126908 | A | 5/2000 |
| JP | 2001-038507 | A | 2/2001 |

OTHER PUBLICATIONS

Patent Abstracts of Japan for JP2001-038507 published on Feb. 13, 2001.

Patent Abstracts of Japan for JP2000-126908 published on May 9, 2000.

Patent Abstracts of Japan for JP07-15206 published Mar. 14, 1995.

Patent Abstracts of Japan for JP04-115506 published on Oct. 14, 1992.

* cited by examiner

INDEXABLE INSERT

CROSS-REFERENCE TO PRIOR APPLICATION

This is a U.S. national phase application under 35 U.S.C. §371 of International Patent Application No. PCT/JP02/12058 filed Nov. 19, 2002, and claims the benefit of Japanese Patent Application Nos. 2001-354459 filed Nov. 20, 2001; 2002-79717 filed Mar. 20, 2002 which are incorporated by reference herein. The International Application was published in Japanese on May 30, 2003 as WO 03/043767 A1 under PCT Article 21(2).

TECHNICAL FIELD

The present invention relates to an indexable insert (hereunder, insert) employed particularly in profile machining to improve the chip control.

BACKGROUND ART

In profile turning using a cutting tool, since the direction of feed, and depth of cut, of the cutting tool changes according to the shape of the work, the chip produced by the cutting edge of the insert mounted at the tip of the cutting tool also sequentially changes in its direction of outflow, width, and thickness. For example, as shown in FIG. 29, when, after an external diameter part extending parallel to a rotation axis S is formed on an outer periphery of a work W, an attempt is made to form an end face part extending in a direction orthogonal to the axis S via a rounded part by an insert T mounted at the tip of the main body of a cutting tool (not shown in drawing), even if depth of cut to the work W surface is made constant so that the thickness of chip becomes constant, in the external diameter part narrow chip is produced in the corner cutting edge C of the insert T. In contrast to this, at the end face part the insert T is provided with feed in the direction to raise it to the outer peripheral side of the work W so that a wide chip is produced using a cutting edge of a certain length from the corner part C. Furthermore, in some cases, as the direction of outflow of the chip changes dramatically in the rounded part between these outer peripheral parts and end face parts, a wide chip may be produced even in the periphery of the corner part C depending upon the shape of the work W prior to cutting.

Therefore, even if a breaker for chip control is formed on the rake face of the insert T, in the case where the breaker is provided to produce narrow chip, when wide chip is produced in back feed cutting in corner cutting, or cutting of the rounded part, it cannot reliably be processed. Conversely, when a breaker is provided to handle wide chip, narrow chip produced during cutting of the outer periphery part is not broken and extends in a long length, winding around the shank of the cutting tool, inhibiting better chip control. Moreover, when the direction of outflow of the chip changes while cutting the rounded part between the external diameter part and the end face part, it is also difficult to reliably control such chip. However, in relation to this point, for example, Japanese Unexamined Patent Application, First Publication No. Hei 9-38807 has proposed a polygonal plate shape insert having a cutting edge, and an adjacent narrow breaker groove, on the top ridge line, and in this breaker groove a substantially hemispherical projection is formed in the vicinity of the corner part on the bisection line of the apex angle. Furthermore, an insert having in plan view a substantially elliptical projection which is long in the parallel direction to the cutting edge formed at a position equidistant from the apex angle corner parts, has been also proposed. However in such inserts, since the chip is simply flowed out along the breaker groove onto the inside of the rake face and collides with the aforementioned respective projections to be broken, the effect of fragmenting the chip and changing the direction of outflow are small. Furthermore if the width of the breaker groove between the aforementioned elliptical projection and the cutting edge is reduced to suit back feed cutting in corner cutting, the problem occurs such that chip jamming occurs while cutting the external diameter part by cutting at a large depth of cut or at high feed, or such that it is unable to control the direction of outflow of the chip by processing the rounded part.

DISCLOSURE OF INVENTION

The present invention is in consideration of the aforementioned background, with an object of providing an insert enabling reliable chip control particularly that produced in profiling as described above.

To resolve the aforementioned problems and achieve this object, the present invention provides an indexable insert including rake faces formed on polygon faces of an insert in the form of a polygonal plate shape, and a pair of cutting edges extending respectively from corner parts of the polygon faces formed on a ridge part of the polygon faces which forms the rake faces, wherein each of the rake faces is gradually inclined as it becomes farther away from the cutting edge, a land is formed along the cutting edge, and this land is inclined so that it gradually sinks as it become farther away from the cutting edge at an angle of inclination smaller than a rake angle, and angles of inclination of these rake face and land are made smaller in the direction to separate from a tip of the corner part along the cutting edge, and a main convex being a convex spherical face shape is formed at intervals between the cutting edges, on the corner part, and at least one pair of sub convexes being a convex spherical face shape is also formed respectively at positions away from this main convex, along the pair of cutting edges.

In this insert, therefore, firstly the land connected to the cutting edge to secure the strength of the edge, and the rake face connected to the land, are inclined so that they gradually sinks as they become farther away from the cutting edge. Moreover, the angle of inclination is made smaller in the direction to separate from the tip of the corner part along the pair of cutting edges. Hence, between the land and the rake face a trough is formed which becomes the deepest on a part from the tip of the corner part toward the inside of the rake face. Therefore, the narrow chip produced by the cutting edge on the tip of the corner part when turning the external diameter part of the work and the rounded part, is guided in the trough formed by the land and the rake face, is flowed out along the bottom of this trough, collides with the surface of the convex spherical face of the main convex formed on the rake face of the tip of the corner part, curls, and is broken.

On the other hand, by gradually reducing the land angle and the rake face along the cutting edge, the wide chip produced when turning in the direction to raise the end face part of the work is curled by gradient bending force in the width direction, and flows out in a condition wherein it is readily broken in the longitudinal direction, that is, the direction of outflow. This chip then collides with the main convex provided on the tip of the corner part on the rake face, and the sub convex provided at the position away from this main convex, and receives the resistance in the direction of outflow to be curled, so that the chip is readily broken and processed. Moreover, since the primary and sub convexes are spherical face shape, they can collide with the chip at a point contact even if the outflow direction of the chip changes, so that stable chip control can be achieved between the external diameter part, the rounded part and end face part. It may be such that at least one pair of the sub convexes per one corner part, that is, at least one per one cutting edge, is provided, and if the cutting edge used is long, a plurality of sub convexes may be provided at intervals to the single cutting edge.

Here, in a case where one of the main convexes is formed on the tip side on the corner part of the rake face, by arranging such that the radius of the convex spherical face formed by the main convex is larger than the radius of the convex spherical face formed by the sub convex, and the top position of the main convex in the thickness direction of the aforementioned insert is higher than the highest point of the sub convex, then when narrow chip is produced on the corner part, the chip can be made to collide with the surface facing the corner part side of the main convex with the larger radius and higher highest point, in order to obtain reliable chip control. On the other hand, even when wide chip is produced using a cutting edge of a certain length, the chip can be made to collide with the surface facing the cutting edge side of this main convex, and the sub convex, in order to obtain reliable chip control.

In this case, it is desirable that the radius of the convex spherical face formed by the main convex be within a range between 10% and 26% of the diameter of the circle inscribed within the polygon face where the aforementioned rake face is formed. If the radius of the main convex is larger than this, the start angle of the dot becomes small, resulting in the possibly that the narrow chip may not sufficiently collide with the main convex but rides up over it. On the other hand, conversely, if the radius of the main convex is smaller than that of the sub convex and the central position is near the edge, the effect to drop the chip into the bottom of the trough is reduced, and the chip control effect is reduced. Moreover, since the chip is dropped into the bottom of the trough, if the central position remains unchanged, the distance between the edge and the wall becomes large, so that the chip is not readily controlled during a small depth of cut. Furthermore, it is desirable that the difference in height between the highest point of the sub convex in the thickness direction of the insert and the highest point of the main convex which was made higher in the thickness direction, be within a range between 0.02 mm and 0.12 mm. If this difference becomes too small so that the heights of the main convex and sub convex become substantially equal, in other words, the height of the main convex becomes relatively low, narrow chip produced from the tip of the corner part of the cutting edge may not sufficiently collide with the main convex but rides up over it, thus losing ease of processing. Conversely, if this difference becomes too large so that the main convex becomes too high, the resistance due to the collision of the chip becomes too large irrespective of the width of the chip, resulting in the possibly that wear of the main convex may be accelerated and the rotation drive force of the work may be increased.

On the other hand, rather than providing a single main convex having a large radius and height on the rake face on the tip of the corner part in this manner, the arrangement may be such that two main convexes are formed on the corner part on the rake face so as to be arranged in the direction across the corner part so that the radii of the convex spherical faces formed by these main convexes are mutually equal, and substantially equal to the convex spherical faces formed by the aforementioned sub convexes, and so that the top position of the main convex in the thickness direction of the insert is also substantially equal to the top position of the aforementioned sub convex. In this case, as well, when narrow chip is produced by the cutting edge on the corner part, the chip flows out along the bottom of the aforementioned trough formed by the land and the rake face and is thus guided in the trough of the two main convexes arranged in the direction across the corner part and collides with one or both of these main convexes. On the other hand, even when wide chip is produced, since the chip collides with the sub convex on the same cutting edge side as the one main convex on the cutting edge side in use of the two main convexes, the chip can be processed reliably in all cases.

In any of the cases where one main convex having a radius and top position larger than these sub convexes is provided, or where two main convexes having radii and heights of the highest points substantially equal to that of the sub convex are provided, it is desirable that the radius of the convex spherical face formed by the sub convex be within a range between 3.0% and 6.5% of the diameter of the circle inscribed within the polygon face where the aforementioned rake face is formed. The reason for this is that, if the radius of the convex spherical face formed by this sub convex is too large, the radius of the main convex also becomes large so that the distance between the tip of the corner part and the main convex naturally becomes too large, and the angle of inclination of the surface of the sub convex starting from the rake face becomes smaller, resulting in the possibility that the breaking effect to the chip is reduced so that the chip is not controlled during low feed cutting, while the part in contact with the chip becomes larger during cutting at a large depth of cut so that the chip resistance may be also increased, and conversely, if the radius is too small, early wear occurs, a reduction of the tool life is appeared. Moreover, it is desirable that, in plan view facing the rake face, the central position of the convex spherical faces formed by the first pair of sub convexes from the aforementioned tip of the corner part is set within a range of between 15% and 40% of the diameter of the circle inscribed on the polygon face where the rake face is formed, toward the direction along the cutting edge adjacent to the sub convex from the tip of the corner part. If the first pair of sub convexes are further away from this, the chip does not reach the sub convexes even when wide chip is produced. On the other hand, if the first pair of sub convexes are close to the tip of the corner part, that is, the main convexes, only the corner part side of the chip collides with the main convexes and sub convexes when wide chip is produced, resulting in a possibility that reliable processing may be inhibited in all cases.

Furthermore, in either the case where one main convex is used or the case where two main convexes are used, on the rake face, in the plan view facing this rake face, a projecting breaker extending to the inside of the rake face from the main convex is formed, and if the height of this breaker in the thickness direction of the aforementioned insert is made higher than the top position of the main convexes and the sub convexes, the chip which collided with these main convexes and sub convexes and rode up over the main convexes and sub convexes can made to collide further with this breaker in order to process even more reliably. In the case where the breaker is formed in this manner, by forming a step part which becomes convex towards the outside of the rake face partway towards this rake face, on a wall of the breaker, the wall extending from the apex of the breaker as viewed in the thickness direction of the insert to the rake face, then for example, even if the distance between this breaker wall face and the cutting edge largely widens depending on the size of the angle of intersection of the pair of cutting edges at the corner part of the rake face, that is, the corner angle, the chip can be made to collide with this step part in order to be reliably controlled. Moreover, in order to secure the strength of the cutting edge by the aforementioned land, and to reliably guide the chip towards the main convex by the aforementioned trough part formed by this land and the rake face, it is desirable that the land angle be within a range between 2° and 15° at the tip of the aforementioned corner part, and 12° or less at the central position of the sub convex adjacent to the main convex, and the difference between the rake angle and the angle of inclination of this land be within a range between 10° and 20°.

BEST MODE FOR CARRYING OUT THE INVENTION

FIG. 1 through FIG. 6 show a first embodiment of the present invention. In this embodiment, an insert 1 is formed into a flat polygonal plate shape of substantially rhomboidal shape of a hard material such as carbide, with rake faces 2 formed on the periphery of the polygon face, that is, the rhomboidal face, with the peripheral faces of the insert 1 as flanks 3, and a pair of cutting edges 4 formed, intersecting at a corner part C of these rhomboidal faces and extending respectively around the ridge parts of the rhomboidal faces where the rake faces 2 and the flanks 3 intersect. Here, the insert 1 of the present embodiment is symmetrical in front and back in relation to the rhomboidal face where the rake faces 2 are formed, and is also respectively symmetrical in relation to a plane including an insert centerline O extending in the thickness direction of the insert 1 passing through the center of the front and back rhomboidal faces, and the bisection line of respective corner parts C. The respective pairs of cutting edges 4 are formed intersecting at the respective four corner parts C on all four ridge parts of these rhomboidal faces, and thus a total of eight pairs of cutting edges 4 are formed on the front and back of a single insert 1. The insert of the present embodiment is a negative insert having an acute angle for the corner part C of the rhomboidal faces of 80°, and the flanks 3 parallel to the insert centerline O without a relief angle.

Figure 3:
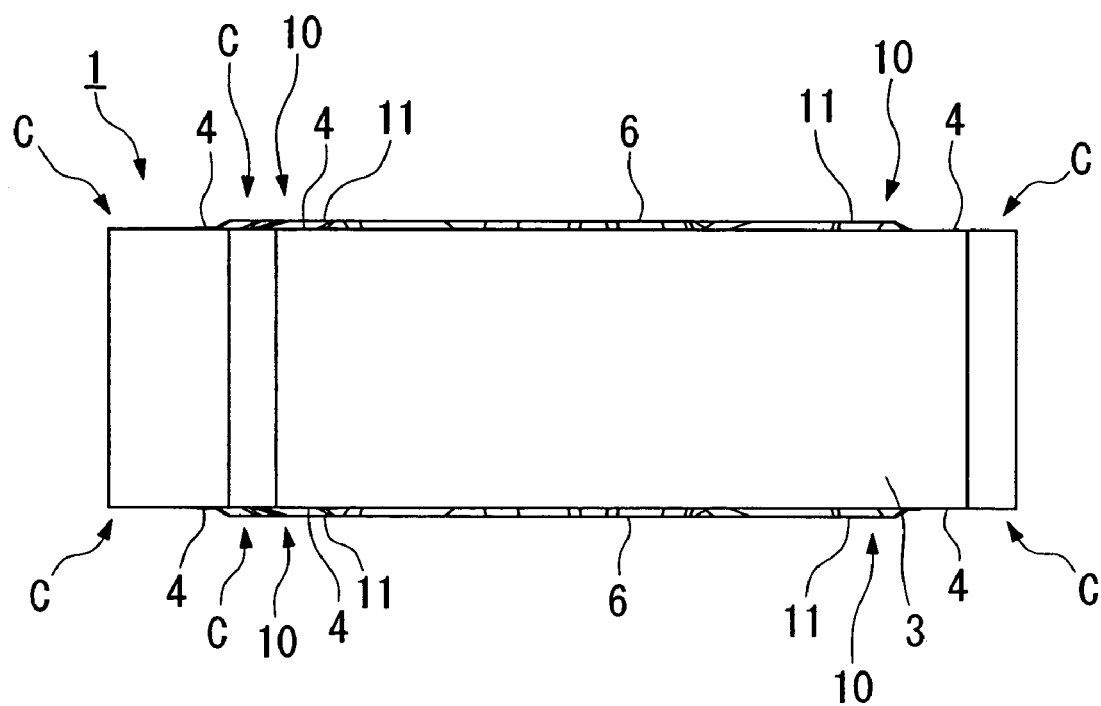
FIG. 3 is a side view of the first embodiment shown in FIG. 1 (a view seen from beneath the insert 1 in FIG. 2).

Furthermore, in the plan view facing the rake faces 2 along the insert centerline O, the respective corner parts C are formed in an arc. The cutting edges 4 are formed so that the cutting edges 4 can smoothly circumscribe with the corner part C and so that a pair of the cutting edges 4 formed on the same ridge part are connected on a straight line. The cutting edges 4 including the corner parts C are positioned on planes orthogonal to the insert centerline O respectively on the front and back. Moreover, a cross-sectional circular mounting hole 5 is provided to penetrate and be centered on the insert centerline O between the central parts of the front and back rhomboidal faces. On the periphery of the opening of the mounting hole 5, as shown in FIG. 3, a flat face 6 is formed in a direction perpendicular to the insert centerline O respectively projecting above the cutting edges 4 on respective rhomboidal faces and raised as high as possible in the thickness direction of the insert 1. Regarding the insert of the present embodiment, in the case where the cutting edges 4 on one rhomboidal face are used for cutting, the flat face 6 on the another rhomboidal face is firmly attached and seated onto an insert shim face of a holder. Then a clamp screw is inserted through the mounting hole 5 and screwed into the mounting seat bottom face, so that it can be detachably installed on the cutting tool. Therefore, the thickness direction of the insert 1 in the present embodiment becomes the direction orthogonal to these flat faces 6. The height in this thickness direction is, for example on the one rhomboidal face side on which cutting edges 4 are used for cutting, the height from the flat face 6 of the other rhomboidal face (polygon face) which is firmly attached to the insert shim face in the direction perpendicular to the flat face 6 towards the one rhomboidal face. In the aforementioned plan view, this flat face 6 is formed in a convex cone shape from the opening of the mounting hole 5 toward the mid-point of the respective ridge parts of the aforementioned rhomboid with the apex caving inwards.

Figure 4:
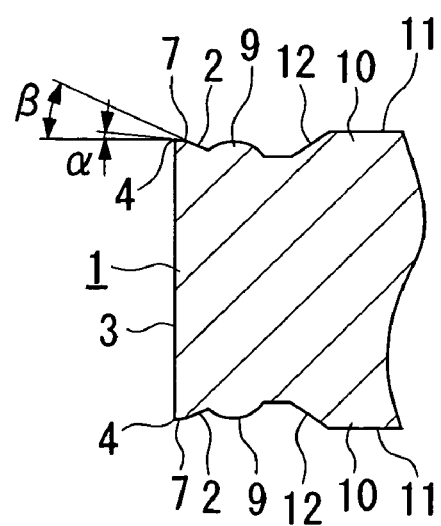
FIG. 4 is a cross-section along the line XX in FIG. 2.
Figure 5:
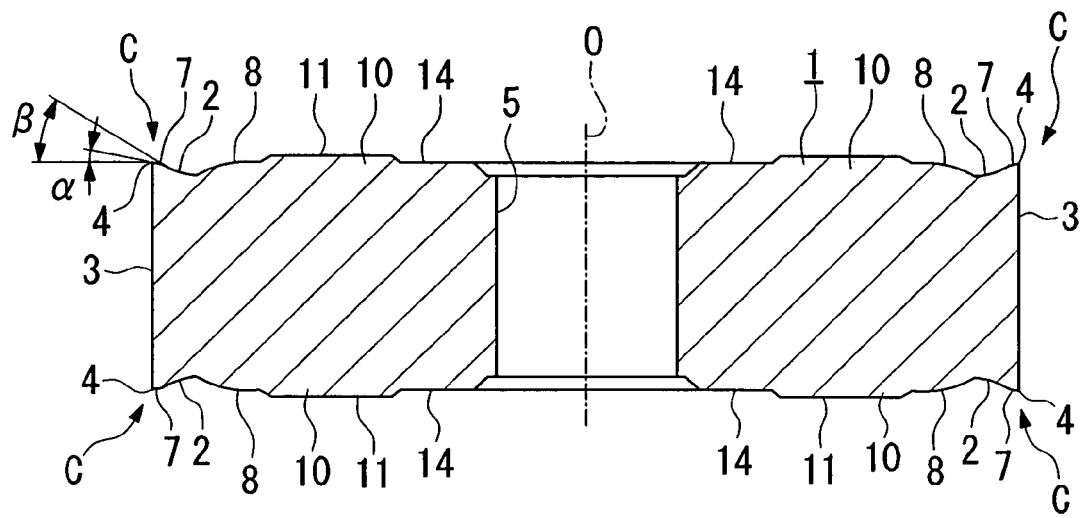
FIG. 5 is a cross-section along the line YY in FIG. 2.
Figure 6:
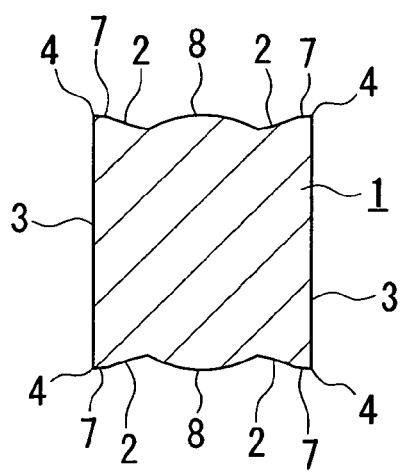
FIG. 6 is a cross-section along the line ZZ in FIG. 2.

Here, as shown in FIG. 4 to FIG. 6, the aforementioned rake face 2 is separated from the cutting edge 4, and inclined so that it gradually sinks as it becomes closer to the inside of the rake face 2. As a result, the cutting edge 4 is provided with a positive rake angle. Furthermore, a land 7 is formed along this cutting edge 4 This land 7 is also separated from the cutting edge 4 and is inclined so that it gradually sinks as it becomes closer to the inside of the rake face 2. The angle of inclination α of these sinking and inclined lands 7 is made smaller than the angle of inclination β of the similarly sinking and inclined rake faces 2 at any position of the cutting edges 4. Consequently, these lands 7 and rake faces 2 are formed in the direction intersecting at an obtuse angle. Therefore, these angles of inclination α and β in the section orthogonal to the cutting edge 4 are both made gradually smaller as they separate respectively from the tip of the corner parts C. That is, from the point of intersection of the corner part C forming the arc in the aforementioned plan view, and the bisection line of this corner part C, along a pair of the cutting edges 4 intersecting at the corner part. The width of the land 7 in the plan view is substantially equal around the entire periphery of the aforementioned rhomboidal face in the present embodiment. However, for example, the width may be increased in the direction to separate from the corner part C.

By changing the angles of inclination α and β of the land 7 and the rake face 2 in this manner, the land 7 and the rake face 2 are formed such that they are inclined at the maximum angles of inclination α and β to deeply sink as they become closer to the inside of the rake face 2 on the bisection line, while they become gradually shallower as they separate from the bisection line along the cutting edges 4. That is, a trough appears such that on the bisection line becomes the bottom part deepest towards the inside of the rake face 2. Incidentally, in the present embodiment, the angle of inclination α of the land 7 on the bisection line at the tip of this corner part C is set to 10°, the angle of inclination β of the rake face 2 is set to 27°, the angle of inclination α of the land 7 on the cross-section orthogonal to the cutting edge 4 on the both ends of the arc corner section C is set to 8°, and the angle of inclination β of the rake face 2 is set to 25°. When the angles of inclination α and β are changed in this manner, the land 7 and the rake face 2 may be twisted faces where the angles of inclination α and β change continuously, or may be multistage faces where the angles of inclination α and β change stepwise.

At each corner part C, a main convex 8 is formed on the tip of the corner part C on the rake face 2 inclined in this manner, and a pair of sub convexes 9 are respectively formed at positions respectively separated from the main convex 8 along the aforementioned pair of cutting edges 4 extending from the tip of this corner part C. Since the insert 1 is formed symmetrically in relation to the bisection line of the corner part C, the main convex 8 and sub convexes 9 are also formed symmetrically in relation to this bisection line. Here, the main convex 8 and the sub convexes 9 are arranged to project on the rake face 2 so that all surfaces becomes a convex spherical face shape. However, the height of the projection from the rake face 2 is made sufficiently smaller than the radius of the spherical face formed by the main convex 8 and the sub convexes 9 to ensure that the surfaces of the main convex 8 and the sub convexes 9 intersect the rake face 2 at an obtuse angle. Moreover, the sub convexes 9 formed at a position separated from the main convex 8 are formed at intervals such that the surfaces do not overlap the main convex 8, and thus the rake face 2 remains between the main convex 8 and the sub convexes 9.

Here, in the present embodiment, the single main convex 8 on the tip of the corner part C of the rake face 2 is set so that the center of the convex spherical face is positioned on the bisection line in plan view. Therefore, the main convex 8 and sub convexes 9 are arranged respectively at the apexes of an isosceles triangle having the bisection line of the corner part C as the bisectrix of the two equal sides. Moreover, the radius R of the convex spherical face formed by this main convex 8 is made larger than the radius r of the convex spherical face formed by the sub convexes 9. Incidentally, in the present embodiment, the diameter of the circle inscribed within the aforementioned rhomboidal face of the insert 1 where the rake face 2 is formed is 12.7 mm, and the radius r of the convex spherical face formed by the sub convexes 9 is 0.6 mm. Consequently, for a radius r of the sub convexes 9 of 4.7% of the inscribed circle diameter d, the radius R of the convex spherical face formed by the main convex 8 is 2 mm. Therefore this is approximately 15.7% of the inscribed circle diameter d, and approximately 3.3 times larger than the radius r of the sub convex 9. Moreover, the top position of the main convex 8 in the thickness direction of the insert 1, that is, the height in the aforementioned thickness direction of the insert 1 at the point of intersection between the surface of the convex spherical face formed by the main convex 8 and a straight line parallel with the insert centerline O passing through the center of the convex spherical face formed by this main convex 8, is made slightly higher than the top position of the sub convex 9, and substantially the same or very slightly higher with respect to the cutting edge 4.

Figure 2:
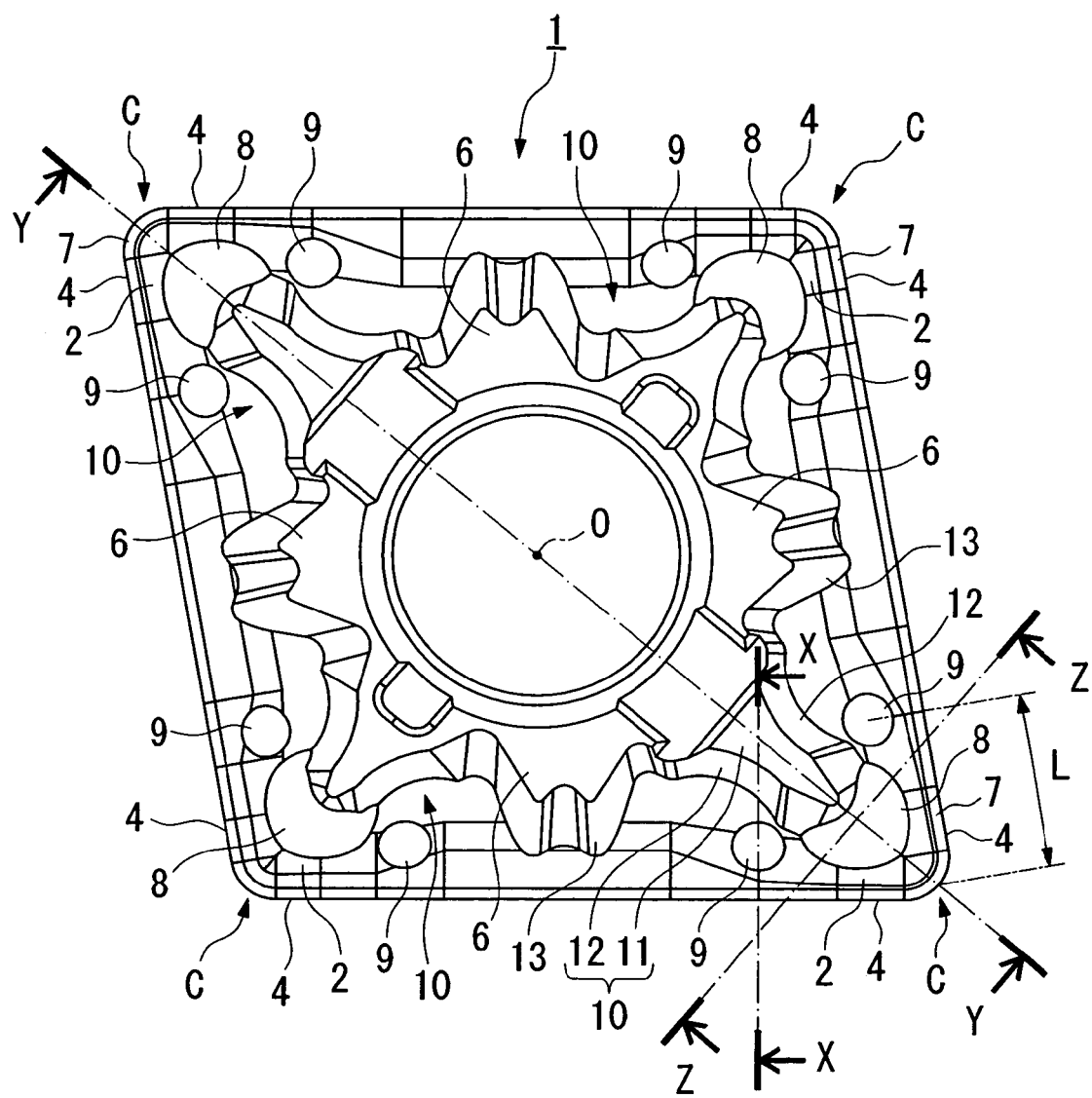
FIG. 2 is a plan view in a direction of an insert centerline O of the first embodiment shown in FIG. 1.

Furthermore, regarding the sub convex 9, as shown in the plan view of FIG. 2, the position of the center of the convex spherical face formed by the sub convex 9 is set at a distance L within a range between 15% and 40% of the diameter d of the aforementioned inscribed circle in the direction from the tip of the corner part C adjacent to this sub convex 9 along the cutting edge 4, extending in a straight line. In the present embodiment, the distance L is 3.5 mm and 27.6% of the inscribed circle diameter d. Incidentally, in the present embodiment, in the cross-section orthogonal to the cutting edge 4 at the position of this distance L, the angle of inclination α of the land 7 is 6°, and the angle of inclination β of the rake face 2 is 22°. Furthermore, in the plan view, the distance between the main convex 8 and the sub convexes 9, and the cutting edge 4 is arranged such that the distance of the narrowest part between the ridge line intersecting with the rake face 2 of the main convex 8 and the sub convexes 9, and the part where the cutting edge 4 extends in a straight line, is substantially equal, or such that the distance between the ridge line intersecting with the rake face 2 of the sub convex 9 and the cutting edge 4 is slightly less than the distance between the intersecting ridge line of the main convex 8 and the cutting edge 4. These intersecting ridge lines are spaced to ensure that they do not overlap the land 7. The distance in the direction of the aforementioned bisection line from the tip of the corner part C of the cutting edge 4 to the ridge line intersecting the main convex 8 and the rake face 2 is slightly greater than the distance from the cutting edge 4 extending in a straight line to the intersecting ridge line of the main convex 8.

Furthermore, in the plan view, projecting breakers 10 are formed on the rake face 2 in order to extend to the inside of the rake face 2 along the bisection line from the main convex 8. Regarding the breaker 10, an apex in the thickness direction of the insert 1 has a flat face 11 perpendicular to the centerline O at a height equal to the aforementioned flat face 6 in this thickness direction. Moreover a breaker wall face 12 from this flat face 11 to the rake face 2 is an inclined face becoming wider in a skirt shape as it becomes closer to the rake face 2. The tip part on the corner part C side of the breaker wall face 12 is connected to overlap with the convex curved face part inside of the rake face 2 of the main convex 8. Furthermore, the rear end part of the breaker wall face 12 on the opposite side is also inclined to become wider in a skirt shape from the flat face 6 to the rake face 2, and is connected to the extending wall face 13. Therefore, the height of the breaker 10 in the thickness direction of the insert 1 is made higher than the highest point of the main convex 8 and the sub convexes 9, and the highest point of the cutting edge 4. Moreover, as shown in FIG. 2, the width of this breaker 10 in the direction orthogonal to the aforementioned bisection line in the plan view becomes greater as it approaches to the rear end part from the connecting part of the main convex 8 at the tip, and is maximized near the pair of sub convexes 9. Then it becomes slightly narrower and constricted towards the rear end part side so that the breaker face 12 forms a concave curved face. After this it becomes wider to connect with the wall face 13. A concavity 14 having a single-step concave with respect to this flat face 11 and the flat face 6 is formed in the part where the flat face 11 of the breaker 10 reaches the opening of the mounting hole 5.

In the insert configured in this manner, the rake face 2 sinks and is inclined as it becomes farther away from the cutting edge 4, and the land 7 sinking and inclined at an angle of inclination $\alpha$ smaller than the angle of inclination $\beta$ of the rake face 2 in the direction to separate from the cutting edge 4 along the cutting edge 4, is also formed on the cutting edge 4. Therefore, while strength of the cutting edge 4 can of course be ensured by increasing the included angle, since the angle of inclination $\alpha$ and $\beta$ of the land 7 and the rake face 2 are made smaller in the direction to separate from the aforementioned tip of the corner part C along the cutting edge 4, the rake face 2 and the land 7 form a trough such that a part from the tip of the corner part C towards the inside of the rake face 2 becomes the bottom as described above. Moreover, the main convexes 8 being convex spherical face shape are formed on the rake face 2 on the tip of the corner part C. Therefore, the narrow chip produced by the cutting edge 4 on the tip of the corner part C when turning the external diameter part of the work and the rounded part, is guided along the bottom of the trough formed by the land 7 and the rake face 2, flows out toward the inside of the rake face 2, is introduced to the main convexes 8 positioned further inside, collides with the surface of the convex spherical face, is made to curl, and is thus broken.

On the other hand, when turning the end face part of a work, in the case where feed is applied to the insert in a direction to raise the insert on the outer peripheral side of the work, regarding wide chip produced by the cutting edge 4 of a certain length extending from the tip of the corner part C in a straight line, the angles of inclination $\alpha$ and $\beta$ of the land 7 and the rake face 2 are made smaller in the direction to separate from the tip of the corner part C along the cutting edge 4. As a result, when scraping on the land 7 and the rake face 2, gradient bending force is received between the side on the tip of the corner part C and the side away from this.

That is, since the angles of inclination $\alpha$ and $\beta$ are greater on the tip of the corner part C side, a force acts on itself to bend the chip in the width direction, and also the resistance is small. Conversely, the large resistance is received on the side away from the tip of the corner part C since the angles of inclination $\alpha$ and $\beta$ are smaller, and hence the chip flows out toward the inside of the rake face 2 in a condition of being curled in the width direction, collides with the main convexes 8 inside of the rake face 2 and the sub convexes 9 on the cutting edge 4 side, and curls in the outflow direction. Therefore, if the chip curled in the width direction in this manner is curled by receiving the resistance in the longitudinal direction, that is, the outflow direction, a considerable force is generated so that the chip is readily broken. Consequently, even in the case where such wide chip is produced, it can be reliably broken and processed according to the insert of the above configuration.

Moreover, in profile turning, even if the outflow direction of the chip sequentially changes such as the case where the process continuously shifts from turning of the external diameter part of the work through the rounded part to the end face part, or conversely the case where the process continuously shifts from the end face part to the external diameter part of the work, in the insert of the above configuration, the land 7 and the rake face 2 are formed in a trough shape as described above. Therefore, when a narrow chip is produced on the tip of the corner part C, it is guided to the bottom part of this trough and reliably collides with the main convexes 8. Moreover, even when a wide chip is produced, it is also guided to the bottom side along this trough, and the angles of inclination $\alpha$ and $\beta$ become smaller along the cutting edge 4 so that the chip is bent and curled. As a result, it can reliably collide with the main convexes 8 and the sub convexes 9. Furthermore, since the main convexes 8 and sub convexes 9 are spherical face shape, they can collide with the chip at a point contact even if the outflow direction of the chip changes. That is, the degree of collision does not change depending on the outflow direction. As a result, stable chip control between the external diameter part in profile turning and the end face part can be performed. On the rake face 2, the main convex 8 is formed on the tip of the corner part C and a pair of the sub convexes 9 are respectively formed in the positions away from the main convex 8 along the pair of the cutting edges 4. Particularly in the present embodiment, the insert 1 is symmetrical in relation to the bisection line so that stable chip control can be also performed, even in the case where a part in use shifts from one cutting edge 4 to the other cutting edge 4 in profile turning for example.

Here, regarding the angles of inclination $\alpha$ and $\beta$ of the land 7 and the rake face 2 which become smaller in the direction extending from the tip of the corner part C towards the cutting edge 4, in the present embodiment, the arrangement is such that, on the cross-section orthogonal to the cutting edge 4, the angle of inclination $\alpha$ on the tip of the corner part C is 10° and the angle of inclination $\beta$ is 27°, and the angle of inclination $\alpha$ at the central position (the position of the aforementioned distance L) of the sub convex 9 is 6° and the angle of inclination $\beta$ is 22°. However, if the angles of inclination $\alpha$ and $\beta$ at the tip of the corner part C are too small, the depth of the trough formed by the land 7 and the rake face 2 becomes small, so that a narrow chip can not be reliably guided. However, if it is too large, the strength of the cutting edge 4 at the tip of the corner part C becomes too weak, which may result in deficiency readily. Furthermore, if the angles of inclination $\alpha$ and $\beta$ at the position of the sub convex 9 are too large, the angles of inclination $\alpha$ and $\beta$ on the tip of the corner part C becomes too large, which also results in a likely deficiency. Conversely, if it is too small, when a wide chip is produced, it may become impossible to sufficiently bend it in the width direction in order to readily fragment. Furthermore, if the angle of inclination $\beta$ of the rake face 2 is too small with respect to the angle of inclination $\alpha$ of the land 7, the projection amount of the dot becomes small and the effect to curl the chip becomes weak. On the other hand, if it is too large, the start from the rake face 2 to the surface of the main convex 8 and the sub convexes 9 becomes too steep so that the resistance when the chip collides with may become too large. Therefore, it is desirable that the angle of inclination $\alpha$ of the land 7 be within a range between 2° and 15° at the tip of the corner part C, 12° or less at the central position of the sub convex 9, and the difference between the angle of inclination $\beta$ of the rake face 2 and the angle of inclination $\alpha$ of the land 7 be within a range of between 10° and 20° at the respective positions.

The arrangement may be such that the angle of inclination $\alpha$ of the land 7 and the angle of inclination $\beta$ of the rake face 2 become continually and gradually smaller respectively in the direction extending from the tip of the corner part C towards the pair of the cutting edges 4, the angles of inclination $\alpha$ and $\beta$ are constant in a predetermined range, and the angles of inclination $\alpha$ and $\beta$ are smaller than these angles and constant in the next determined range in the above direction. It may be also such that these are combined to give angles of inclination $\alpha$ and $\beta$ which coincide in a predetermined range, and in another predetermined range, the angles of inclination $\alpha$ and $\beta$ become gradually smaller in the above direction. Particularly, in the latter two cases, it may be such that the angles of inclination $\alpha$ and the angles of inclination $\beta$ are constant respectively in mutually different predetermined ranges, and they become gradually smaller in the above direction. A part at which the land 7 and the rake face 2 intersect may be smoothly connected by an arc convex curved line on a cross-section orthogonal to the cutting edge 4. Furthermore, at least the rake face 2 may be formed in a concave curved line which becomes slowly concave on the cross-section. Furthermore, the bottom part of the aforementioned trough where the land 7 and the rake face 2 connect to the pair of the cutting edges 4 extending from the corner part C intersect, may be formed such that a cross-section orthogonal to the aforementioned bisection line is V-shaped, or a part over the bisection line may be formed into a concave curved face.

On the other hand, in the present embodiment, only one main convex 8 is formed on the tip on the corner part C of the rake face 2, the radius R of the convex spherical face formed by the main convex 8 is larger than the radius r of the sub convex 9, and the top position of the main convex 8 in the thickness direction of the aforementioned insert 1 is higher than that of the sub convex 9. Therefore, even when narrow chip is produced and flows out along the bottom part of the trough formed by the land 7 and the rake face 2, the chip can be made to reliably collide with the main convexes 8 with the larger radius R and higher highest point, and curl, and thus be broken. Moreover, even when wide chip is produced, since the radius R of the main convex 8 is made larger, the surface on the side where the cutting edge 4 extends in a straight line can be set closer to the cutting edge 4, and the wide chip produced by bending in the width direction as described above, can be made to reliably collide with the main convex 8 and the sub convex 9, and curl in the outflow direction, and thus be broken and processed. In the present embodiment, the distance between the cutting edge 4 extending in a straight line, the main convex 8, and the sub convexes 9, is arranged to be substantially equal or such that the distance between the sub convexes 9 is slightly less. As a result, both end parts in the width direction of the wide chip can be made collide with the main convex 8 and sub convexes 9 substantially at the same time, and curl in the outflow direction, or the chip can be made to collide with any one of the main convex 8 and sub convexes 9, so that the situation where the chip is overall inhibited to curl in the outflow direction can be prevented.

In the present embodiment, the arrangement is such that the radius r of the convex spherical face formed by the sub convex 9 that becomes the small diameter with respect to the main convex 8 having the higher highest point on the large diameter in this manner, is 4.7% of the inscribed circle diameter d on the polygon face (rhomboidal face) on which the rake face 2 is formed. However, if the radius r becomes too large, the angle of inclination $\theta$ of the convex spherical face of the sub convex 9 starting from the rake face 2 shown in FIG. 4 becomes small, resulting in the possibility that the breaking effect to the chip is reduced so that the chip is not controlled during low feed cutting. On the other hand, the surface part in contact with the chip becomes longer in the circumference direction during high feed cutting, avoiding point contact. Hence the chip resistance may be increased. If the radius r of the sub convex 9 is large, the radius R of the main convex 8 also becomes large. Therefore, when an attempt is made to ensure the distance between the main convex 8 and the cutting edge 4 part in a straight line so that the wide chip can collide with the main convex 8 and sub convex 9 when it is appropriately bent and curled in the outflow direction, the distance between the tip of the corner part C and the main convex 8 becomes too large, resulting in the possibility that narrow chip when produced can not be made to collide with the main convex 8 promptly and be processed. On the other hand, conversely, if the radius r of the sub convex 9 is too small, the sub convex 9 is worn out at an early stage due to abrasion when the wide chip collides, resulting in the possibility that the life of the insert may be shortened. Consequently, it is desirable that the radius r of the sub convex 9 be within a range between 3.0 and 6.5% of the inscribed circle diameter of the insert 1.

If the radius R of the main convex 8 is too large, the start angle of the main convex 8 becomes small, resulting in the possibly that the narrow chip may not sufficiently collide with the main convex 8 but rides up over it. On the other hand, conversely, if it is too small, naturally the possibility becomes such that the main convex 8 may be worn out at an early stage. When the central position of the main convex 8 having a smaller radius R is made too close to the tip of the corner part C, the effect to drop the chip into the bottom of the trough is reduced, and the chip control effect is reduced. Moreover, since the chip is dropped into the bottom of the trough in this manner, if the central position of the main convex 8 remains unchanged as when the radius R is large, the cutting edge 4 and the wall of the start of the spherical face of the main convex 8 separates, so that the chip is not readily controlled during small depth of cut. Therefore, it is desirable that the radius R of the main convex 8 be within a range between 10% and 26% of the inscribed circle diameter d. Furthermore, regarding the difference in height between the highest point of the main convex 8 and the sub convex 9 in the thickness direction of the insert 1, if this difference becomes too small so that the heights of the main convex 8 and sub convex 9 become substantially equal, in other words, the height of the main convex 8 becomes relatively low, narrow chip produced from the tip of the corner part C of the cutting edge 4 may not sufficiently collide with the main convex 8 but rides up over it, thus losing ease of processing. Conversely, if the main convex 8 becomes too high, the resistance due to the collision of the chip becomes too large irrespective of the width of the chip, resulting in the possibly that wear of the main convex 8 may be accelerated and the rotation drive force of the work may be increased. Therefore, it is desirable that the difference in height be within a range between 0.02 and 0.12 mm. Furthermore, if the distance between the central position of the sub convex 9 and the cutting edge 4, that is the distance between the central position of the convex spherical face formed by the sub convex 9 and the cutting edge 4 in the plan view, is too large, the main convex 8 has to be also moved back to the inside of the rake face 2. As a result, the distance between these main convexes 8 and the corner part C becomes too large. On the other hand, if the distance between the sub convex 9 and the cutting edge 4 is too small, wide chip produced when turning in the direction to raise to the end face part of the work, may collide with the sub convexes 9 and the main convex 8 before being curled sufficiently in the width direction, resulting in the possibility that, even if it is curled in the outflow direction, it may not be reliably broken. Therefore, it is desirable to set within a range between 5 and 12% of the inscribed circle diameter d.

Furthermore, in the case where the position of the sub convex 9 extending in the direction of the cutting edge 4 is too far away from the tip of the corner part C, even if relatively wide chip is produced, the end part on the sub convex 9 side of both end parts in the width direction may not collide with the sub convex 9. Conversely, in the case where the sub convex 9 is too close to the corner part C, similarly if wide chip is produced, only the part on the corner part C side in the width direction collides with the main convex 8 and the sub convex 9. In any cases, the chip collides on the one side, and even if the chip is curled in the width direction by the land 7 and the rake face 2, only the one side of collision is broken, resulting in the possibility that the chip may remain unbroken on the other side. Therefore, it is desirable that the position of the sub convex 9 in the above direction, that is, the distance L in plan view from the tip of the corner part C to the sub convex 9 in the direction along the cutting edge 4 in a straight line be set within a range between 15% and 40% of the inscribed circle diameter d.

Figure 28:
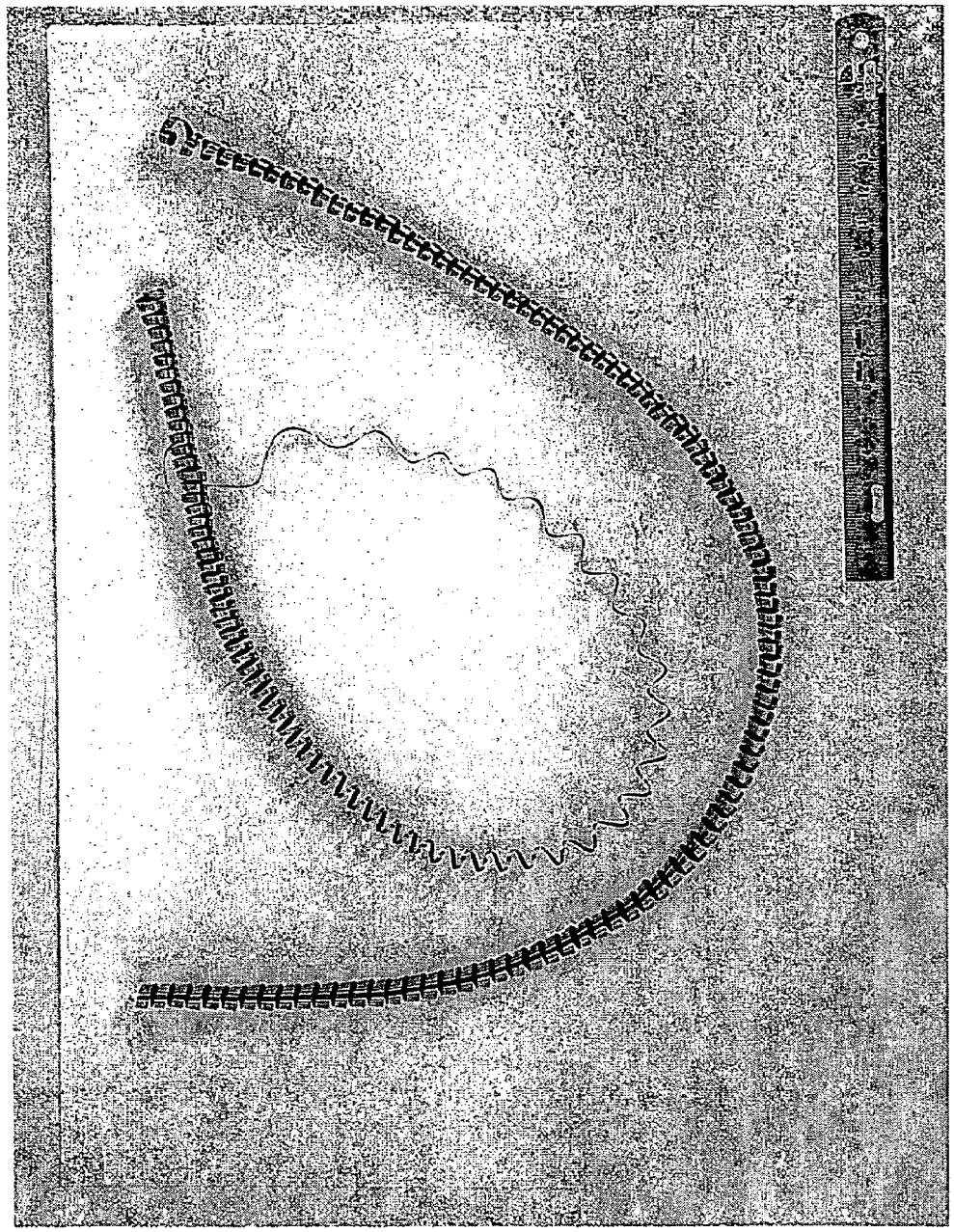
FIG. 28 shows chip when cutting the rounded part of the work W according to the first comparative example.

In the present invention, the arrangement is such that one pair of the sub convexes 9 per one pair of the cutting edges 4 intersecting the corner part C is respectively provided on the corner parts C. However, similarly to the modified example described later, if the cutting edge 4 used is long, a plurality of pairs of sub convexes may be provided for the respective cutting edges at intervals in the above direction. In such case, the distance L is the distance from the tip of the corner part C to the first pair of the sub convexes 9. Regarding the insert of rhomboidal plate shape as in the present embodiment, if it is used for the aforementioned profile turning, then as shown in FIG. 28, the cutting edges 4 intersecting the corner part C having an acute angle of the rhomboidal shape are used. Therefore, in such an insert, as shown in FIG. 2, at least at the corner parts having an acute angle, the distance L may be within the aforementioned range.

Furthermore, in the present embodiment, projecting breakers 10 extending to the inside of the rake face 2 further from the main convex 8 are formed on the rake face 2. The height of the breakers 10 in the thickness direction of the insert 1, that is, the height of the flat face 11 of the apex, is made naturally higher than the highest point of the sub convex 9, and higher than the highest point of the main convex 8. Therefore, even if the chip collide with the main convex 8 or the sub convex 9, it is not sufficiently curled but rides up over it, then outflows to the inside of the rake face 2, and is made to collide with this high breaker 10 positioned further inside, so that the chip can be further reliably broken and processed. Furthermore, the width of this breaker 10 in the direction orthogonal to the aforementioned bisection line becomes greater as it becomes closer to the rear end part from the connecting part of the main convex 8 at the tip, is maximized near the pair of sub convexes 9, and then becomes narrower. The parts where the ridge line intersecting with the flat face 11 and the breaker wall face 12 becomes pointed are respectively formed inside of the main convex 8 and the sub convexes 9. Therefore, the chip rides up the main convex 8 and the sub convexes 9 and is point contacted with this pointed part and curled. As a result, even if the outflow direction of the chip changes, it can be reliably broken and the advantage is obtained in that the resistance can be kept from increasing. In addition, in the present embodiment, the breaker wall face 12 is connected to the wall face 13 which is inclined in a skirt shape from the aforementioned flat face 6, and the flat face 6 is formed in the convex cone shape toward the mid-point of respective ridge parts of the aforementioned rhomboidal face of the insert 1 where the rake face 2 is formed. As a result, even in the case where by chance, a cutting edge 4 having a half length of the ridge part or longer is used, the end part in the width direction of the chip can be made to collide with the wall face 13 connected to the apex of the cone, and curled.

Figure 7:
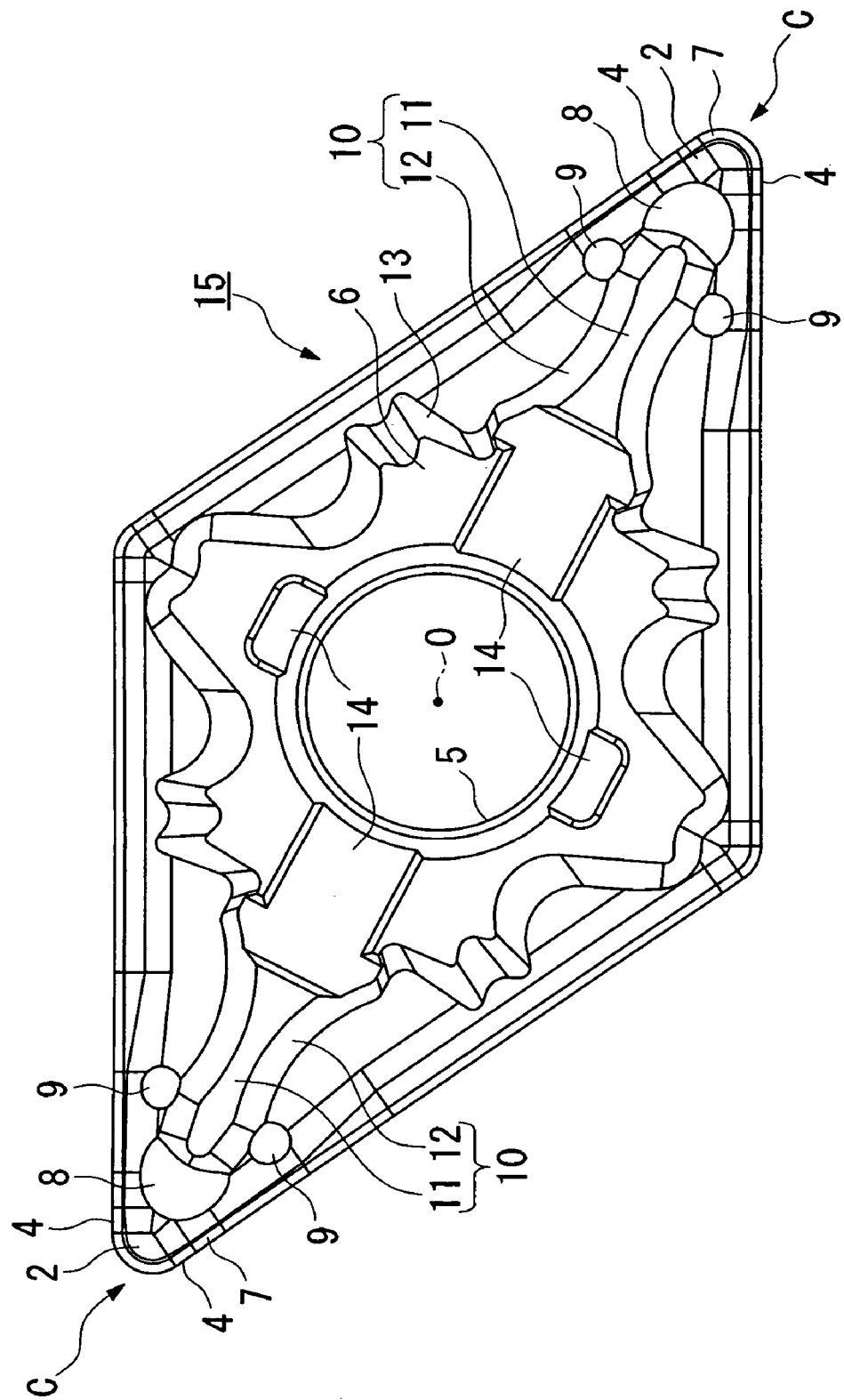
FIG. 7 is a plan view showing a modified example of the first embodiment.
Figure 8:
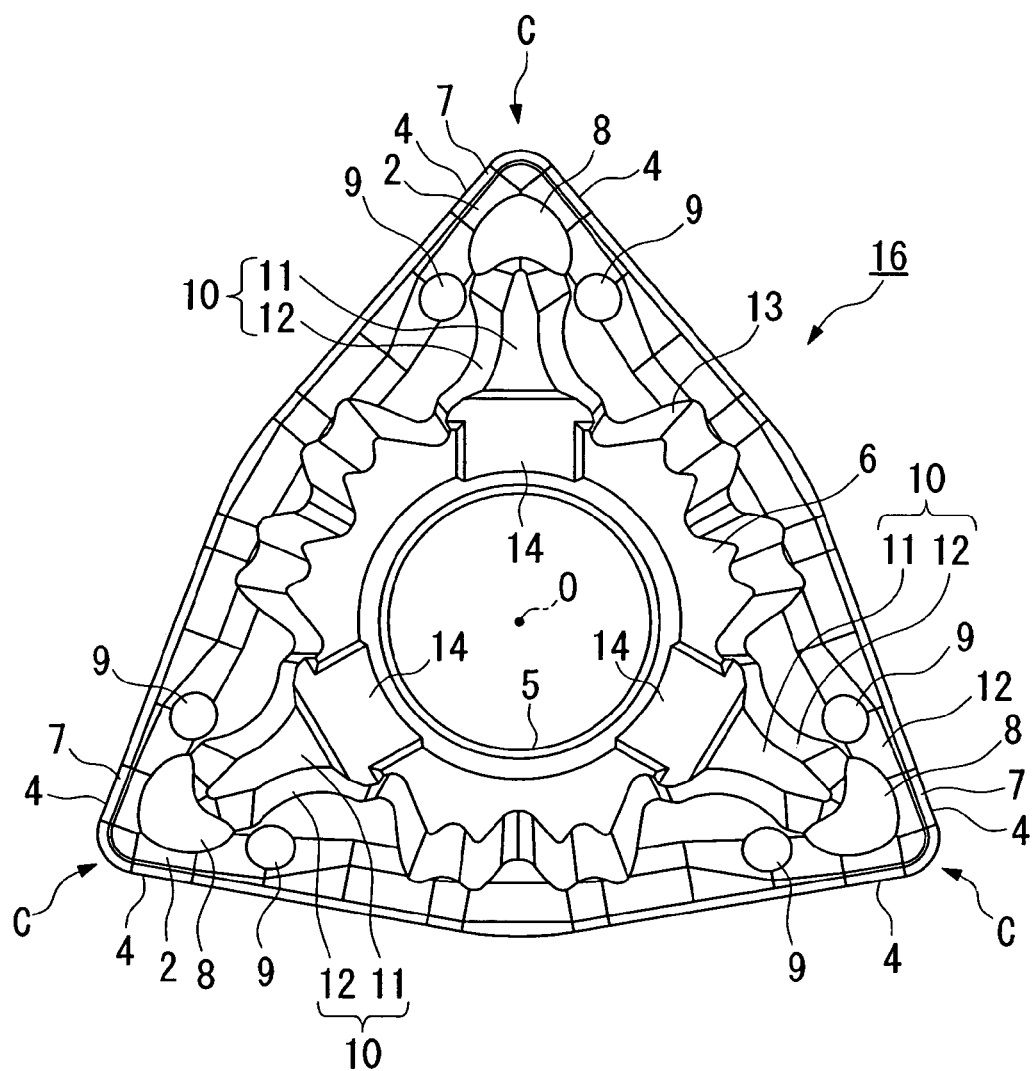
FIG. 8 is a plan view showing a modified example of the first embodiment.
Figure 9:
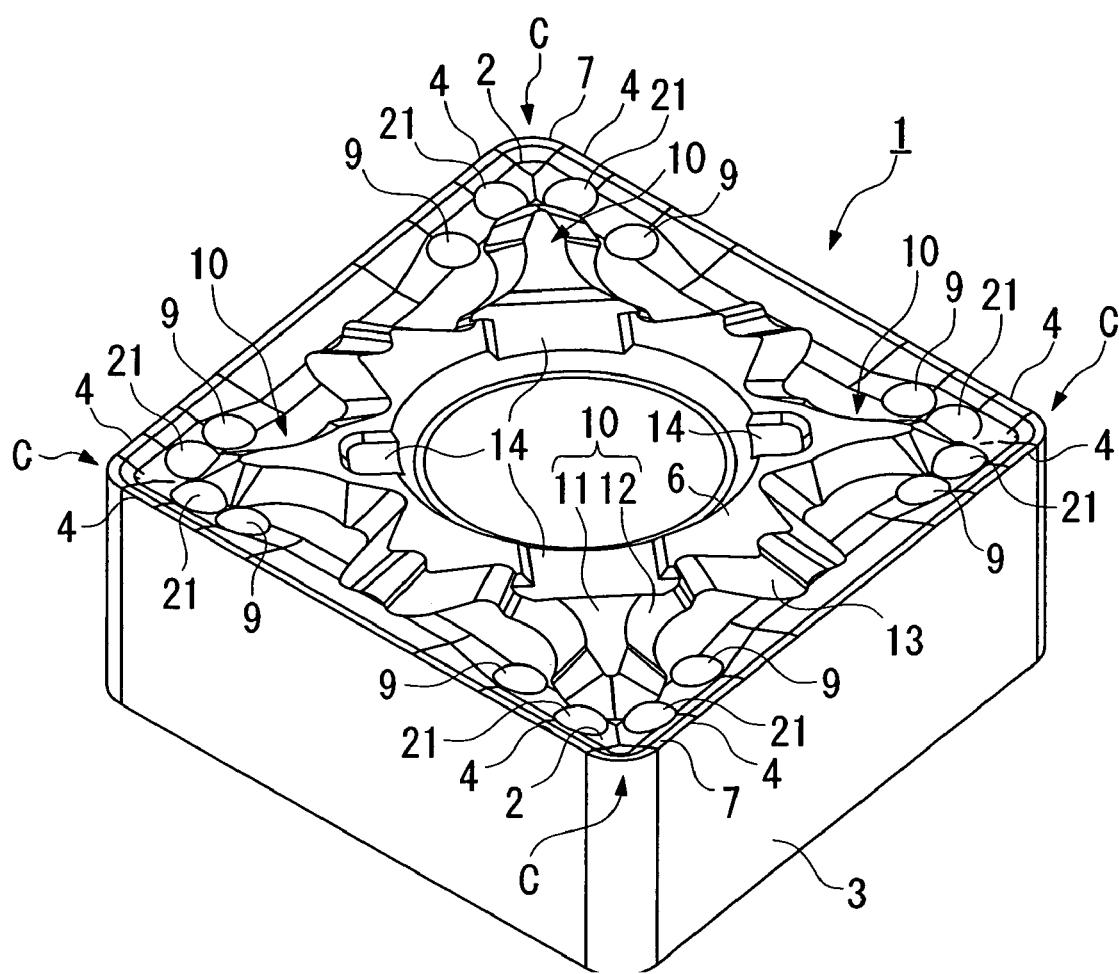
FIG. 9 is a perspective view showing a second embodiment of the present invention.

FIG. 7 and FIG. 8 respectively show modified examples of the first embodiment. The same reference symbols are provided for the same components as in the first embodiment, and the description is omitted. In the modified example shown in FIG. 7, the insert 15 is a rhomboidal plate shape similarly to the first embodiment. However, the acute angle of the corner part C is made smaller than that of the first embodiment and is 55°, and on the corner part side having an obtuse angle the main convex and the sub convexes are not formed. This is because only the cutting edges 4 intersecting with the corner part C having an acute angle are solely used for such an insert. The cutting edge length of the respective cutting edges 4 is made longer by as much a half of the one ridge part of the rhombus. Therefore, a plurality pairs of the sub convexes 9 may be formed along the cutting edge 4 as described above. Moreover, in the modified example shown in FIG. 8, the insert 16 is formed in an approximate equilateral triangle, strictly speaking, a substantially hexagonal plate shape where the respective ridge parts are equal in length, and the corner parts C having the equal acute angles and the corner parts having the equal obtuse angles are alternatively arranged in the peripheral direction. The respective ridge parts of this partial hexagon are the cutting edges 4 intersecting and forming pairs at the corner parts C having the acute angle. Therefore, in this modified embodiment, a total of six pairs of the cutting edges 4 intersecting at the respective three corner parts C on the front and back can be used.

Figure 15:
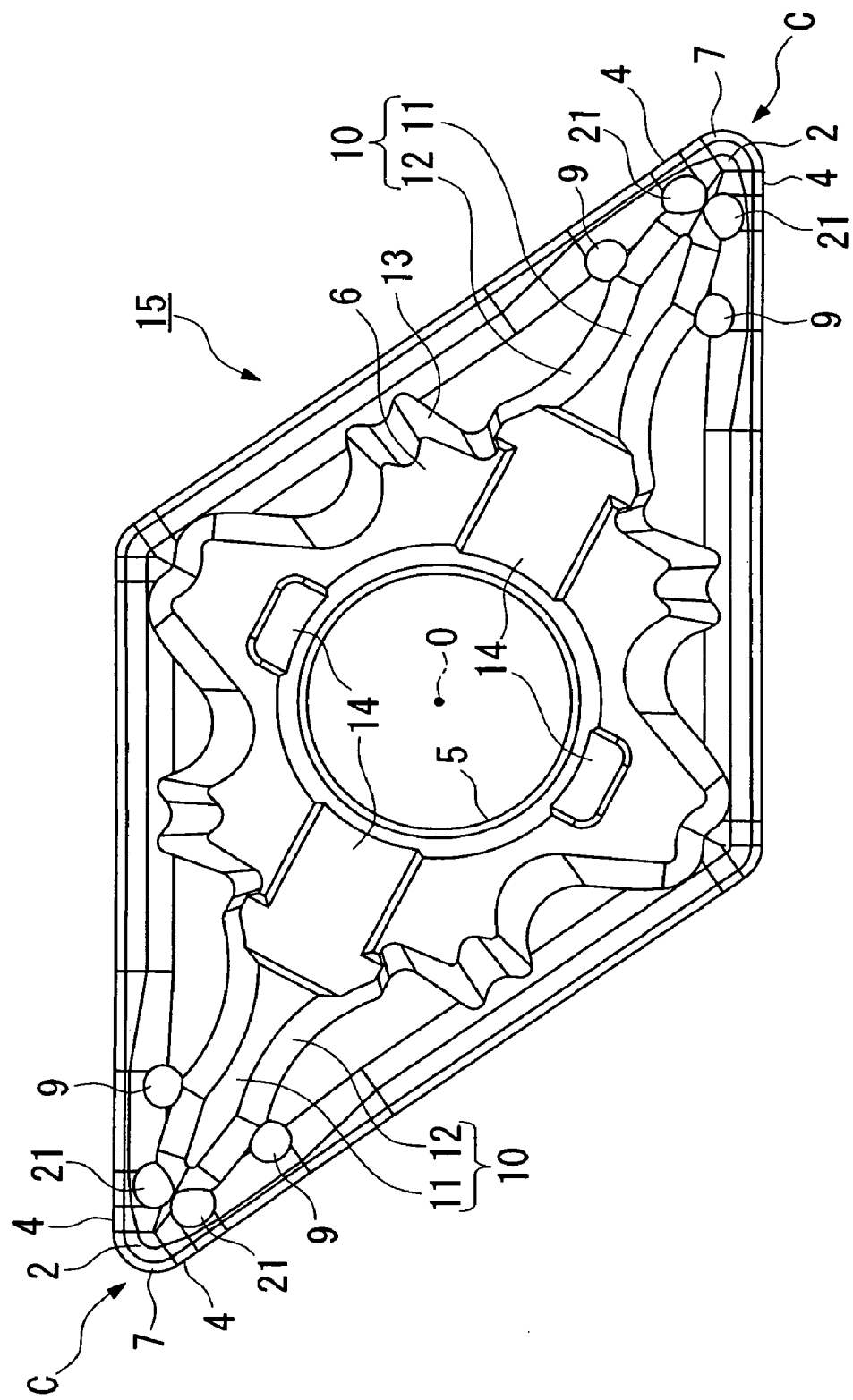
FIG. 15 is a plan view showing a modified example of the second embodiment.
Figure 16:
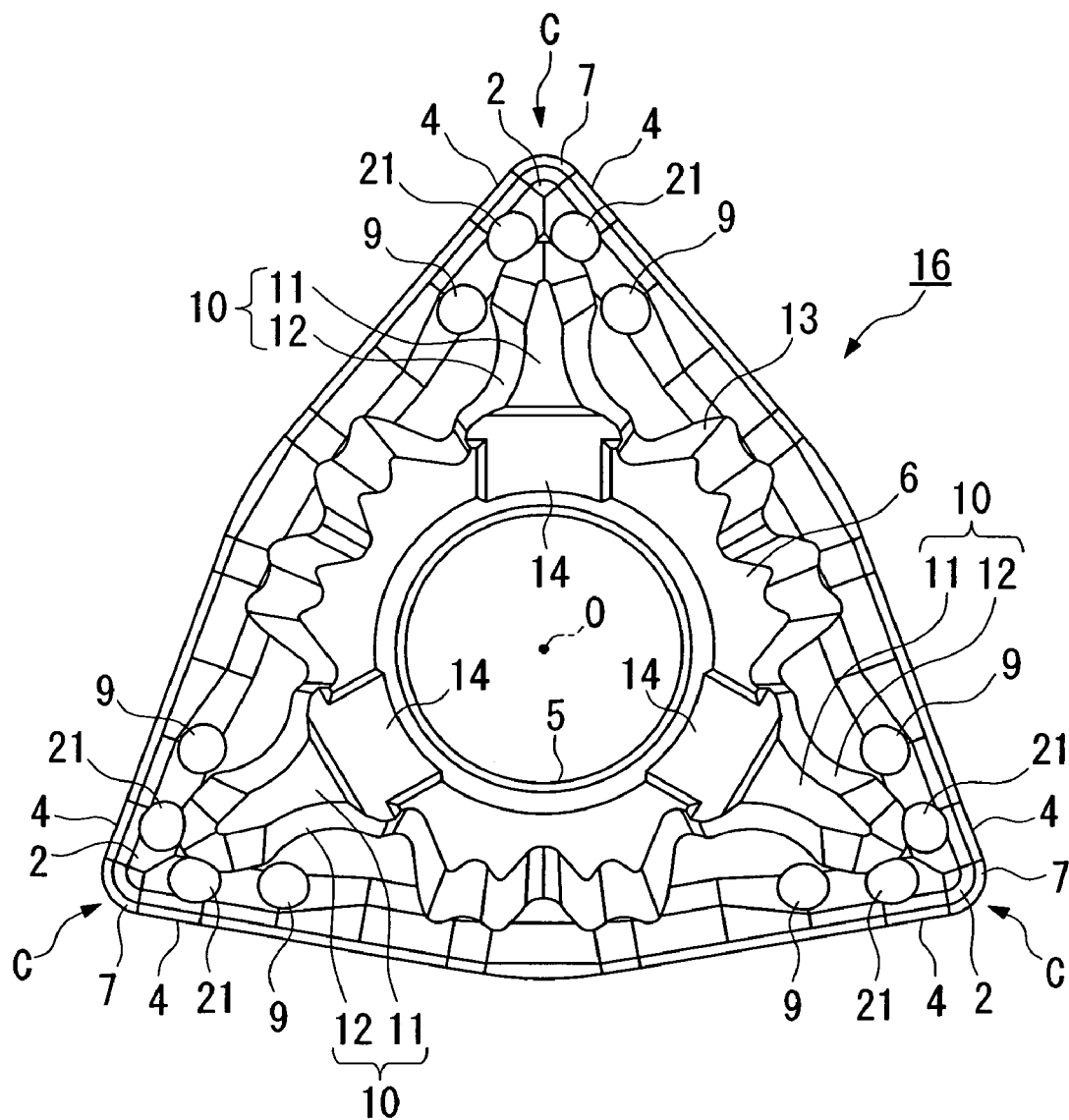
FIG. 16 is a plan view showing a modified example of the second embodiment.
Figure 17:
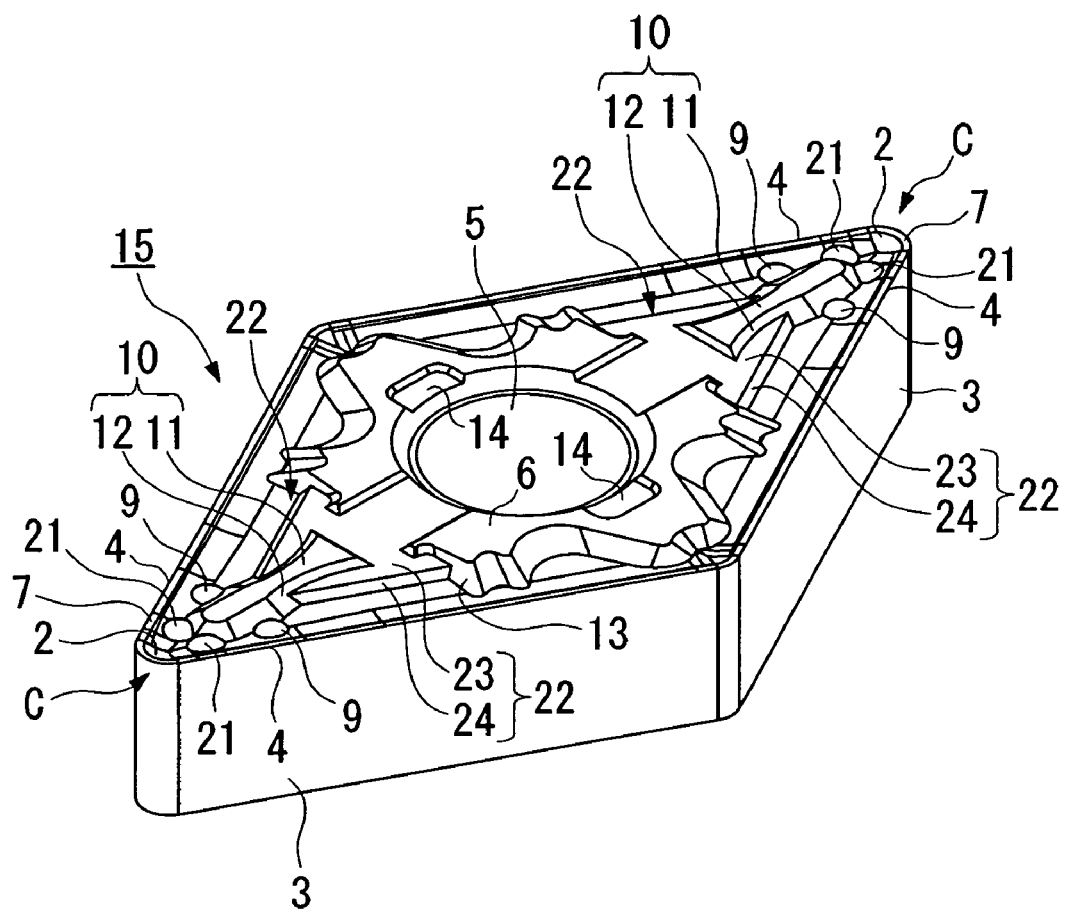
FIG. 17 is a perspective view showing a modified example of the second embodiment.
Figure 18:
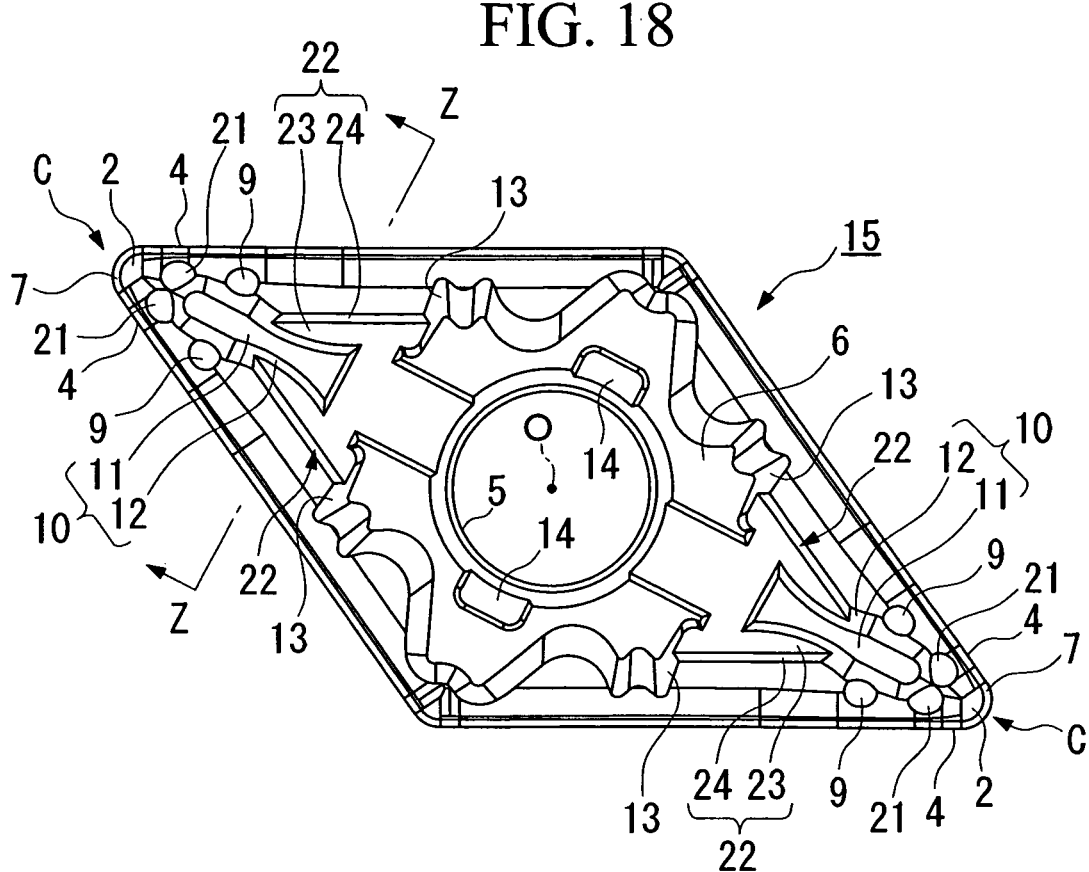
FIG. 18 is a plan view of the modified example shown in FIG. 17.
Figure 19:
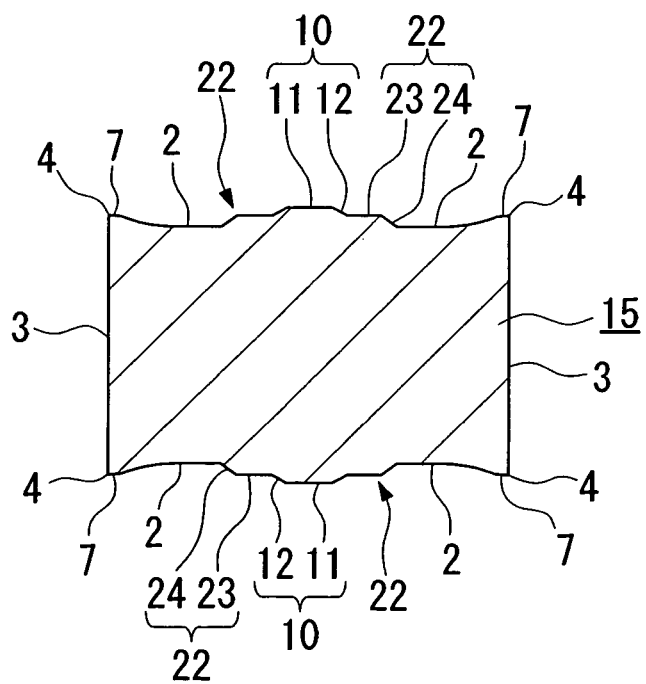
FIG. 19 is a cross-section along the line ZZ in FIG. 17.
Figure 20:
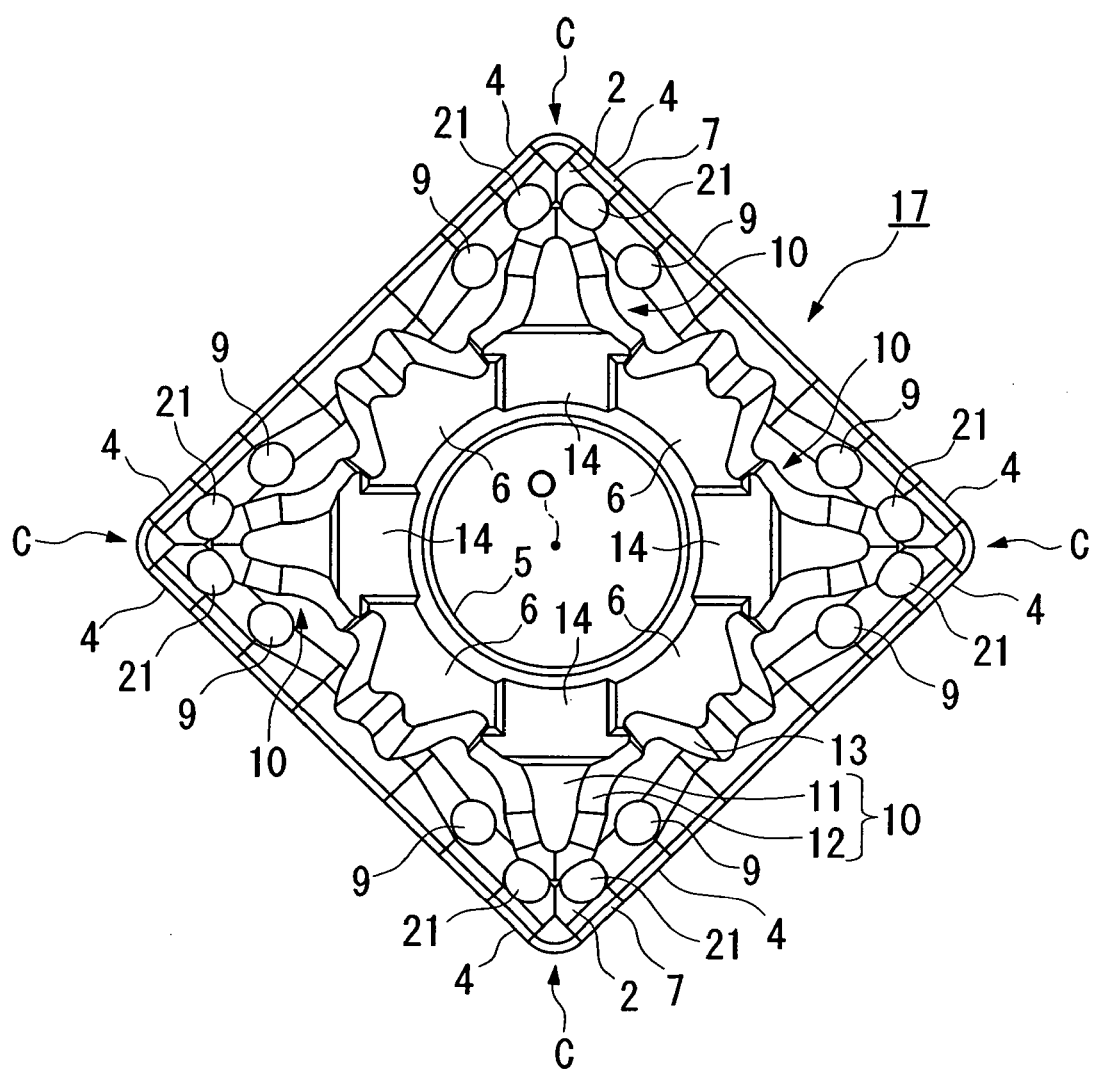
FIG. 20 is a plan view showing a modified example of the second embodiment.
Figure 21:
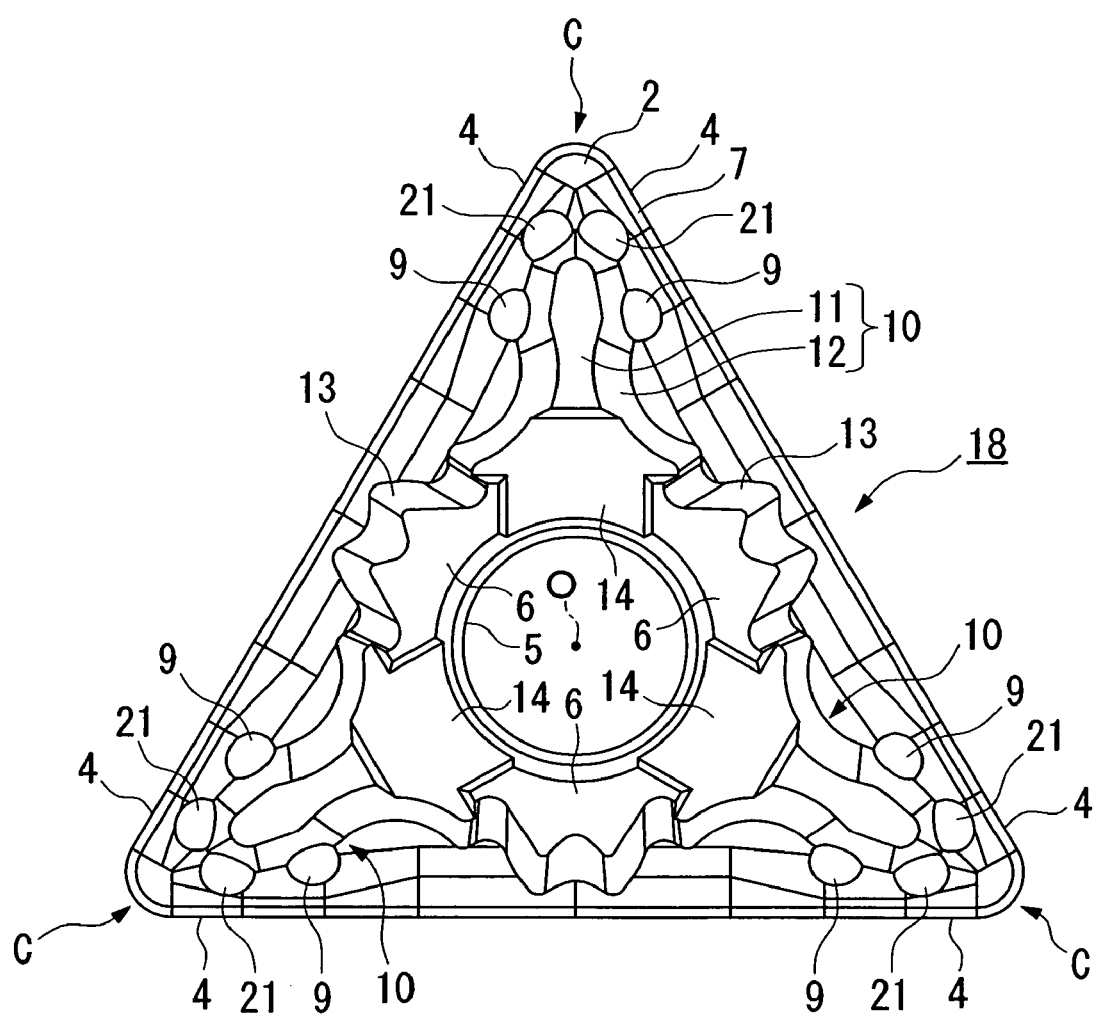
FIG. 21 is a plan view showing a modified example of the second embodiment.
Figure 22:
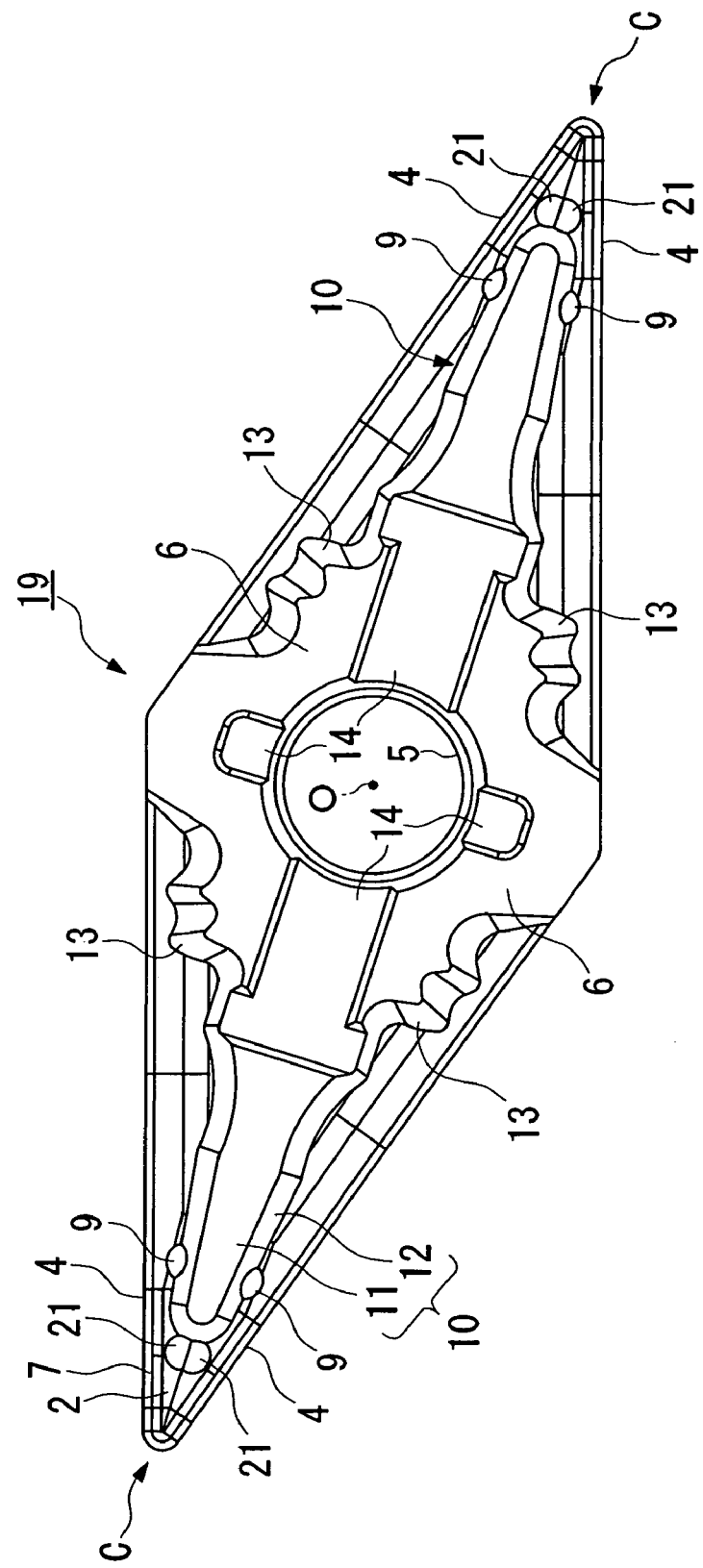
FIG. 22 is a plan view showing a modified example of the second embodiment.

Next, FIG. 9 to FIG. 14 show a second embodiment of the present invention and FIG. 15 to FIG. 22 show modified examples of the second embodiment. In all the drawings, the same reference symbols are provided for the same components as in the first embodiment shown in FIG. 1 to FIG. 6, and description is omitted. Of these modified examples, FIG. 15 and FIG. 17 to FIG. 19 respectively show, similarly to the modified example of the first embodiment shown in FIG. 7, that the insert 15 is a rhomboidal plate shape having an acute angle for the corner part C of 55°. FIG. 16 shows, similarly to the first embodiment shown in FIG. 8, that the insert 16 is formed in a substantially hexagonal plate shape. FIG. 20 shows that the insert 17 is formed in a substantially square plate shape. FIG. 21 shows that the insert 18 is formed in a substantially equilateral triangular plate shape having straight ridge parts. FIG. 22 shows a modified example such that the insert 19 is formed in a rhomboidal plate shape having a further acute angle for the corner part C of 35°.

However, in the first embodiment and its modified examples, one main convex 8 is formed on the tip of the corner part C of the rake face 2, while in the second embodiment and its modified examples two main convexes 21 are formed on the tip of the corner part C of the rake face 2 and arranged in the direction across the corner part C. Here, in the plan view, these two main convexes 21 are arranged symmetrically in the direction orthogonal to the aforementioned bisection line of the corner part C in relation to this bisection line. However, a pair of the intersecting ridge lines of the main convexes 21 and the rake face 2 are separated so as not to mutually overlap except for in the modified example shown in FIG. 22. On the tip part of the aforementioned breaker 10, the inclined breaker wall face 12 is made to intersect with the rake face 2 on the bisection line between the main convexes 21.

Moreover, the main convexes 21, similarly to the aforementioned main convex 8, form convex spherical faces projecting from the rake face 2 at a smaller projection height than its radius. However, the radii of the convex spherical face formed by these main convexes 21 are made substantially equal to the radius r of the sub convex 9. The radii of the both main convexes 21 are also made mutually equal. The top positions of these main convexes 21 in the thickness direction of the insert 1 are made mutually equal, and substantially equal to the top positions of the aforementioned sub convexes 9. In the second embodiment and its modified examples, the radius r of the sub convex 9 is within a range between 3.0 and 6.5% of the aforementioned inscribed circle diameter d. Therefore, the radius of the main convex 21 is also within a range between 3.0 to 6.5% of the inscribed circle diameter d. Moreover, the distance L from the tip of the corner part C to the center of the sub convex 9 extending in the direction along the cutting edge 4 part in a straight line is within a range between 15% and 40% of the inscribed circle diameter d. Furthermore, the distance between the cutting edge 4 extending in a straight line, the adjacent main convexes 21, and the sub convex 9 is substantially equal to the distance between the ridge line intersecting with the rake face 2 and the main convexes 21 and sub convexes 9, and the cutting edge 4. Alternatively, conversely to the first embodiment, as shown in FIG. 10, FIG. 15, FIG. 16, FIG. 18, and FIG. 20 to FIG. 22, the distance between the main convex 21 and the sub convex 9 is slightly more than the distance between the pair of main convexes 21.

Therefore, in the insert of the second embodiment and its modified examples configured in this manner, in the case where wide chip is produced using a part extending from the tip of the corner part C in a straight line of the cutting edge 4, the angles of inclination α and β of the land 7 and the rake face 2 connecting to the cutting edge 4 are made smaller in the direction extending from the tip of the corner part C to the cutting edge 4. As a result, the chip is curled in the width direction and flows out in the condition of being readily broken. On the rake face 2 in the interior of the cutting edge 4 extending in a straight line, the sub convex 9 adjacent to the cutting edge 4 of the aforementioned pair of sub convexes 9, and the main convex 21 adjacent to the cutting edge 4 of the aforementioned pair of main convexes 21 are arranged away from each other extending in the direction of the cutting edge 4, that is the width direction of the chip. Furthermore, the main convex 21 and the sub convex 9 are made substantially equal in radius and top position in the thickness direction. As a result, both end parts in the width direction of the chip can be made to collide with the main convexes 21 and sub convexes 9 substantially evenly, so that the chip receives resistance in the outflow direction and is curled, and can thus be readily broken as described above, and hence readily processed.

Figure 10:
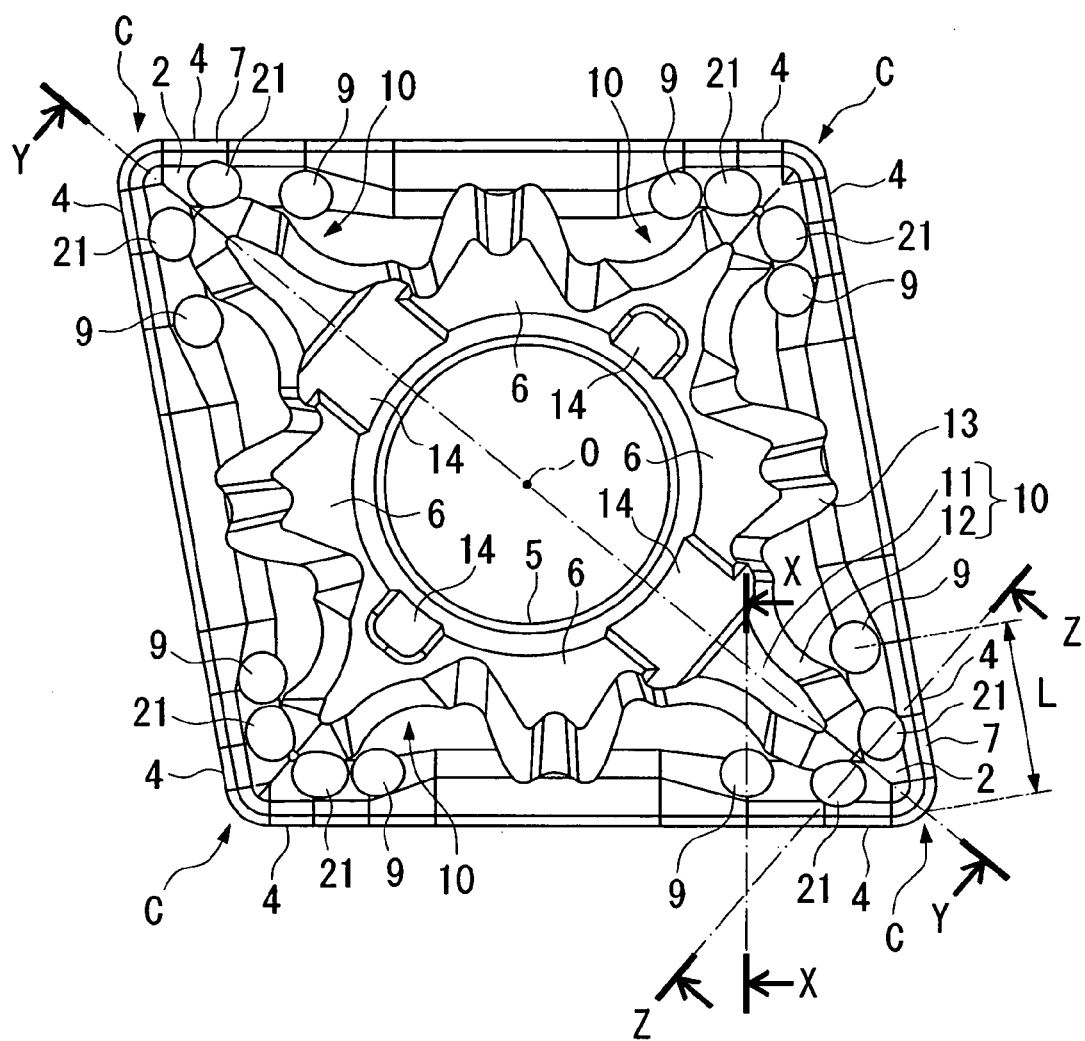
FIG. 10 is a plan view in a direction of an insert centerline O of the second embodiment shown in FIG. 9.
Figure 11:
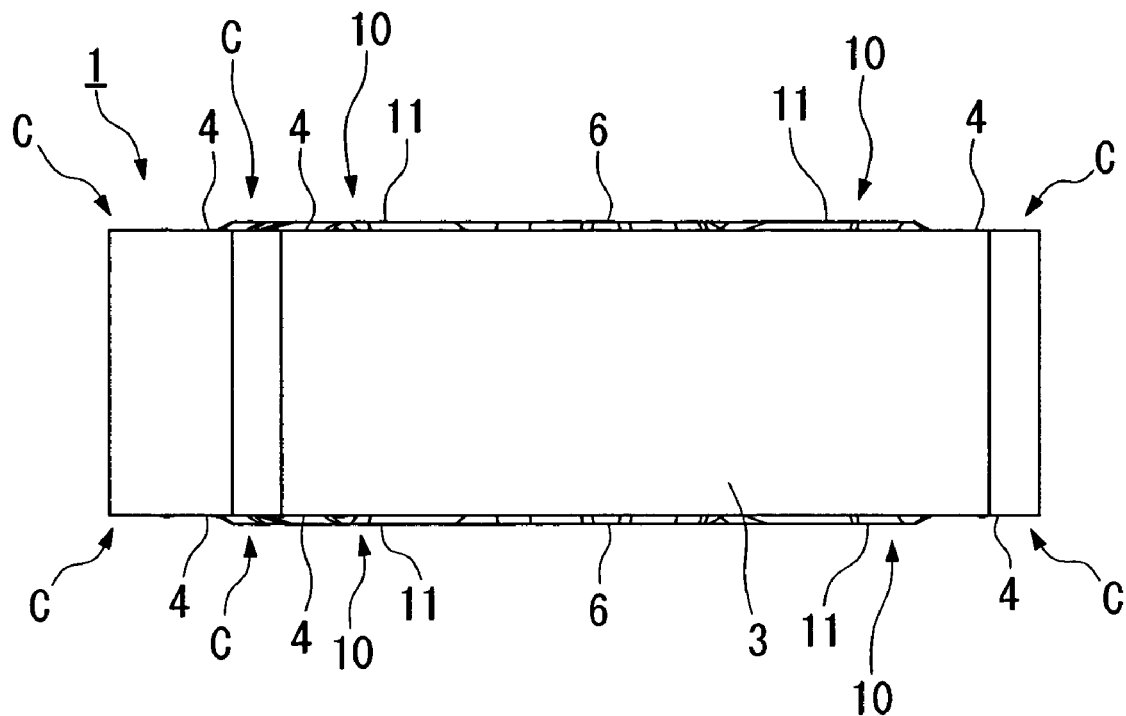
FIG. 11 is a side view of the second embodiment shown in FIG. 9 (a view seen from beneath the insert 1 in FIG. 10).
Figure 12:
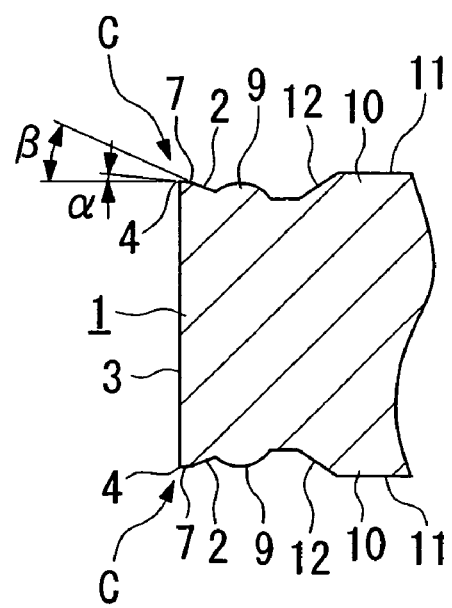
FIG. 12 is a cross-section along the line XX in FIG. 10.
Figure 13:
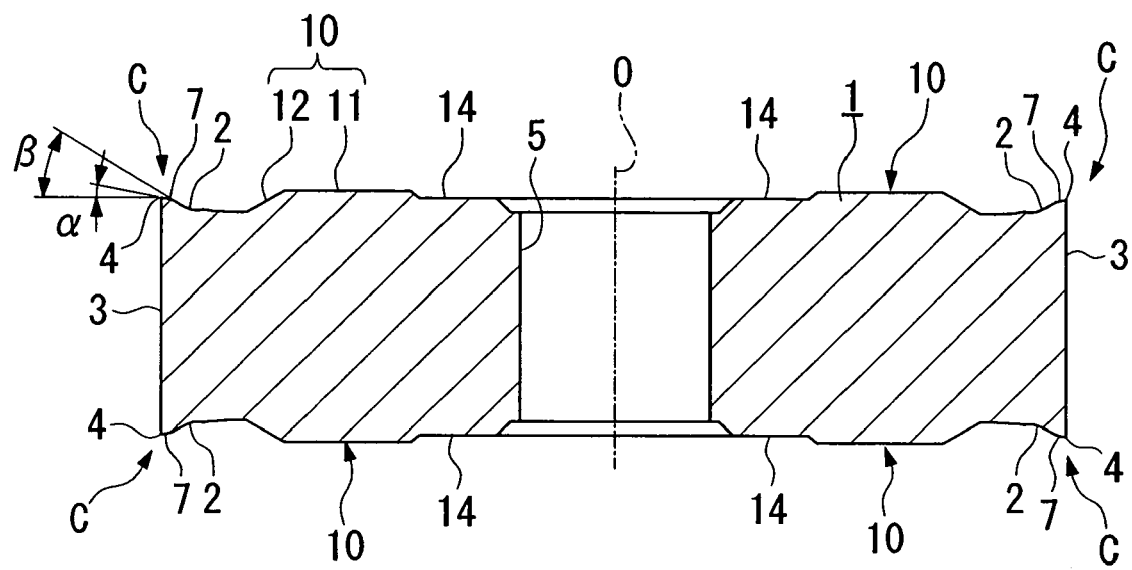
FIG. 13 is a cross-section along the line YY in FIG. 10.
Figure 14:
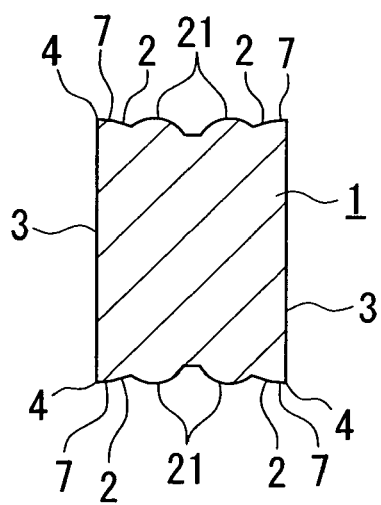
FIG. 14 is a cross-section along the line ZZ in FIG. 10.

On the other hand, in the present embodiment and its modified examples, two main convexes 21 are formed on the tip of the corner part C of the rake face 2 in a row in the direction across the corner part C. As a result, in the interior of the aforementioned trough formed by the land 7 and the rake face 2, two cones due to these main convexes 21 stand out on either side of the bottom part of this trough. Therefore, in the case where narrow chip is produced by using the cutting edge 4 on the tip of the corner part C, the chip flowing out along the bottom of the trough is made to collide with one or both of the two cones in the interior of the bottom part, and is curled and broken. The distance of the cutting edge 4 in this case between the tip of the corner part C and the main convexes 21, that is the distance between the main convexes 21 and the ridge line intersecting with the rake face 2 becomes greater as is apparent by comparing FIG. 2 and FIG. 10, compared with the case, as in the first embodiment for example, where the radius R is large so that one cone having the high highest point is provided on the rake face 2. Therefore, in the present embodiment, in the position where the rake face 2 sinks and is inclined more deeply, the main convexes 21 having smaller radii, that is larger curvature, stand out, so that it is possible to give a stronger resistance to the chip which flows out on the rake face 2 to make this less curled. Consequently, even in the case where narrow chip is produced in this manner, in particular as with the case of cutting at small depth of cut or low feed cutting when chip having a thin wall thickness with a tendency to be slightly stretched is produced, it becomes possible to obtain superior chip processability.

Even in such a second embodiment and its modified examples, if the radius r of the convex spherical face formed by the sub convex 9 is too large, the chip is not controlled during low feed cutting, and the chip resistance is increased during high feed cutting, and the radius of the main convexes 21 being substantially the same radius as the sub convexes 9 becomes larger. Consequently, if two such main convexes 21 are formed on the rake face 2 in a row in the direction across the corner part C, the distance between the main convexes 21 and the tip of the corner part C becomes too large, and the chip flows out more than necessary on the rake face 2 until it collides with the main convexes 21, resulting in the possibility that it may become difficult to reliably collide with the main convexes 21. On the other hand, conversely, if the radius r of the sub convex 9 is too small, similarly to the first embodiment, the sub convex 9 is naturally worn out at an early stage, and the main convexes 21 are also worn out. Therefore, it is desirable that the radius r of the sub convex 9 be also within a range between 3.0 and 6.5% of the aforementioned inscribed circle diameter d. Consequently, in the second embodiment, it is desirable that the radius of the convex spherical face formed by the main convex 21 be within a range between 3.0 and 6.5% of the diameter of the circle inscribed within the polygon face of the insert 1 where the rake face 2 is formed.

Regarding the distance L from the tip of the corner part C to the central position of the sub convex 9, if it is too large so that the sub convex 9 is too far away from the main convexes 21, when wide chip is produced, only the one end part in the width direction may be made to collide with the main convexes 21. On the other hand, if the distance L is too small so that the sub convex 9 is too close to the main convexes 21, only the one end part of wide chip may collide with the main convexes 21 and the sub convex 9. In any cases, the chip collides on the one side so that it may not be possible to reliably curl in the outflow direction and fragment. Therefore, it is desirable that the distance L be within a range between 15% and 40% of the inscribed circle diameter d.

Incidentally, in the modified examples shown in FIG. 7 and FIG. 15, in the case where the insert 15 is a rhomboidal plate shape having an acute angle for the corner part C of 55° or a rhomboidal plate shape having an acute angle for the corner part C of 60°, if the aforementioned breaker 10 is formed such that the width, particularly in the direction orthogonal to the bisection line of the corner part becomes greater as it becomes closer to the rear end part from the connecting part of the main convex 8, is maximized near the pair of sub convexes 9, and then becomes slightly narrower, as shown in FIG. 7 and FIG. 15, in a part where the width of the breaker 10 on the opposite side of the corner part C from the sub convex 9 along the cutting edge 4 becomes narrower, then the distance between the cutting edge 4 and the breaker wall face 12 is largely widened, resulting in the possibility that the chip produced by this part of the cutting edge 4 may be tend to be slightly stretched. Therefore, in such a case, the sub convex 9 may be provided even in the part where the spacing is widened as described above. Besides, for example in the modified examples shown in FIG. 17 and FIG. 19, on the aforementioned breaker wall face 12 of the breaker 10, partway on the breaker wall face 12 from the apex 11 to the rake face 2, a step part 22 which becomes convex from the breaker wall face 12 towards the outside of the rake face 2, that is toward the cutting edge 4 side, may be formed.

Here, this step part 22 includes a flat face 23 which is parallel to the aforementioned flat face 11 on the apex of the breaker 10 and is lowered in the thickness direction, and a wall face 24 which is inclined to the rake face 2 at substantially the same inclination as the breaker wall face 12, being a step shape having one-step down from the flat face 11 of the breaker 10. The flat face 24, in plan view facing the rake face 2 along the centerline O, is formed from near where the width of the breaker 10 starts to become narrower, so as to extend substantially in parallel to the cutting edge 4 in a straight line to reach the aforementioned wall face 13. Therefore, according to the insert of the modified example where such a step part 22 is provided on the breaker wall face 12, even if the sub convex 9 is not provided in the part where the distance between the breaker wall face 12 and the cutting edge 4 is largely widened, chip produced by cutting edge 4 can be contacted with the wall face 24 of the step part 22 or the intersecting ridge line part of the wall face 24 and the flat face 23 to make it collide. As a result, it can be in curled, so that the chip can be prevented from being slightly stretched, and smooth processing can be performed.

Figure 1:
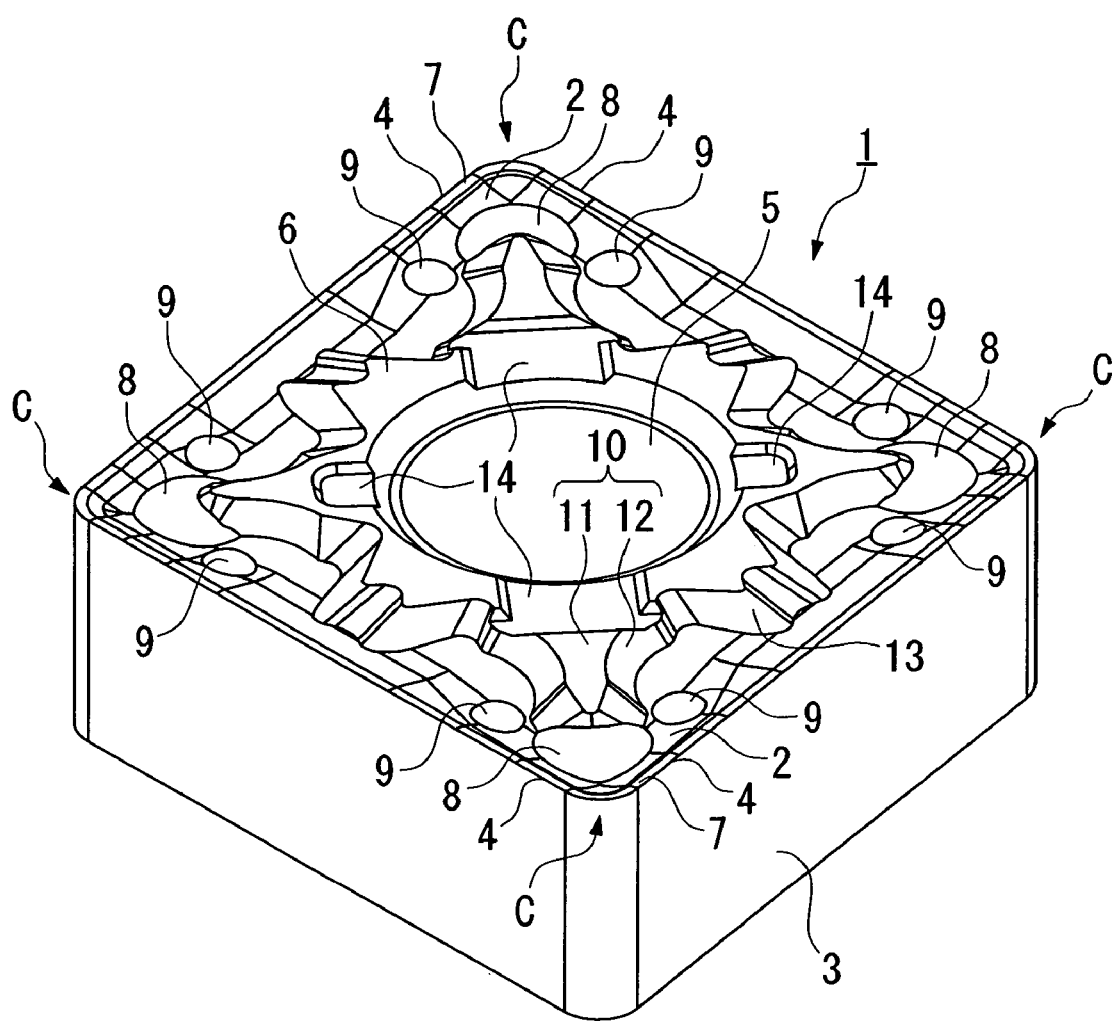
FIG. 1 is an perspective view showing a first embodiment of the present invention.

As shown in FIG. 1 and FIG. 10, in the case where the insert 1 is a rhomboidal plate shape having a large acute angle for the corner part C of 85°, or as shown in FIG. 20 in the case where the insert 17 is formed in an approximate square plate shape having a large acute angle for the corner part C of 90°, or as shown in FIG. 8, FIG. 16 and FIG. 21 in the case where the insert 16 or 18 is formed in an approximate equilateral triangular plate shape, on one ridge part of a polygon formed by the rake face 2, the cutting edges 4 are formed to extend from the corner parts C on the both ends. Therefore the length of the respective cutting edges 4 is shortened to about half of the one ridge part. Hence the length of the cutting edge 4 on the opposite side of the corner part C from the sub convex 9 is also short. Consequently, even if the aforementioned step part 22 is not provided, chip can be reliably controlled by the sub convexes 9, the main convexes 8 and 21, or the breaker 10. On the other hand, as shown in FIG. 22, in the case where the insert 19 is also the rhomboidal plate shape, but has a small acute angle for the corner part C of 35°, the distance between the cutting edge 4 and the breaker 10 is never largely widened from the beginning. Therefore it is effective to provide the step part 22 to an insert having an insert of a rhomboidal plate shape having an angle of the corner part C of around 55° and 60° as described above.

EXAMPLES

Figure 23:
FIG. 23 shows chip when cutting an end face part P, an external diameter part Q, and a chamfered part M, of a work W according to the first embodiment of the present invention.
Figure 24:
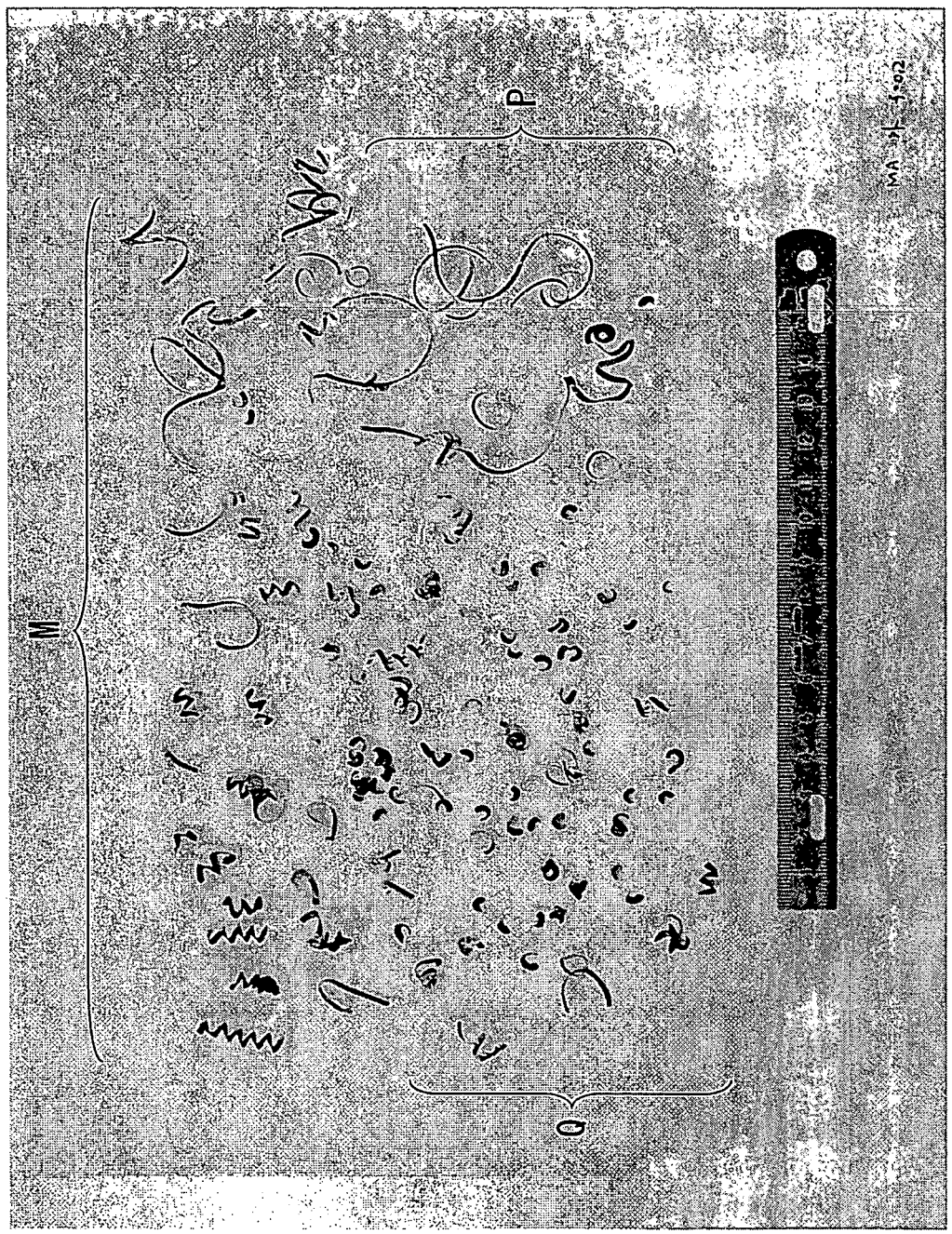
FIG. 24 shows chip when cutting the end face part P, the external diameter part Q, and the chamfered part M, of the work W according to a first comparative example.
Figure 25:
FIG. 25 shows chip when cutting the end face part P, the external diameter part Q, and the chamfered part M, of the work W according to with a second comparative example.
Figure 26:
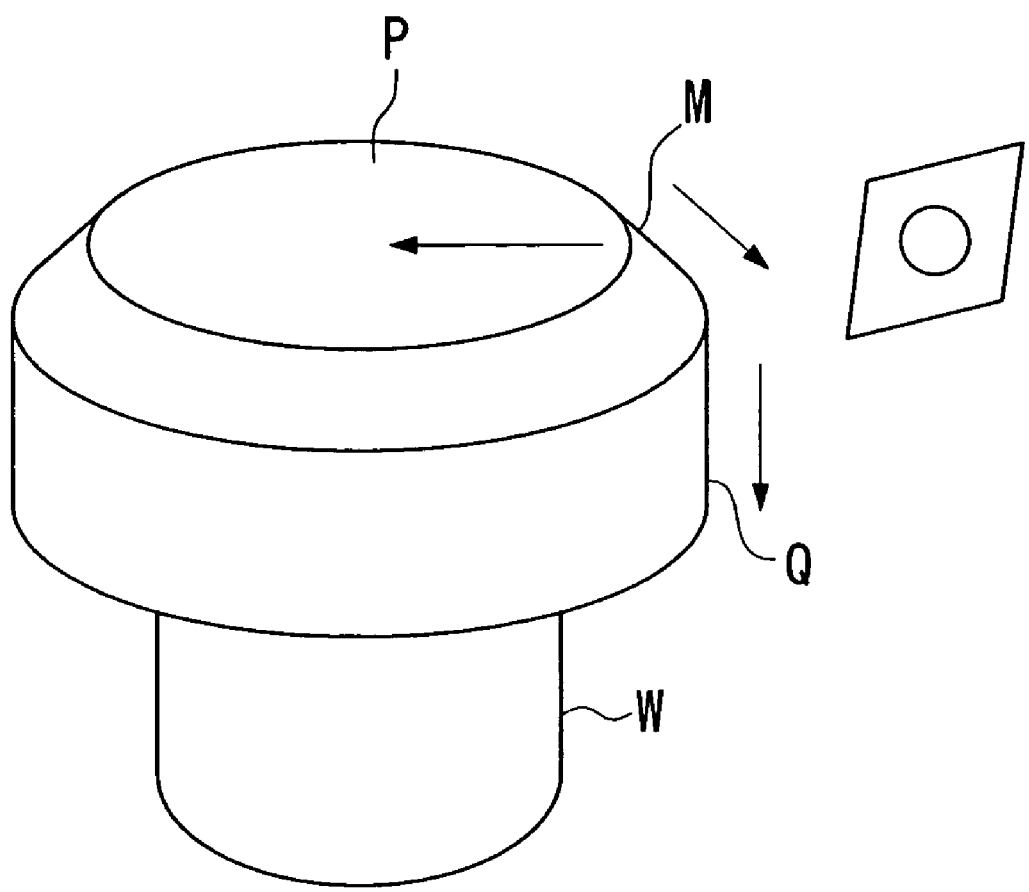
FIG. 26 shows cutting processing according to the examples shown in FIG. 23 to FIG. 25.

Here, FIG. 23 shows the shape of chip due to the insert of the first embodiment shown in the FIG. 1 to FIG. 6, and FIG. 24 and FIG. 25 shows, in comparison to this, the shape of chip due to the insert of the first and the second comparative examples, for the case where the feed rate was 0.1 to 0.2 mm/rev, and the depth of cut was 1 mm. At first, the condition of the chip is shown for the case where as, shown in FIG. 26, an end face part P is formed orthogonal to the rotation axis of the work W, an external diameter part Q is formed orthogonal extending parallel to the rotation axis S, and a chamfered part M formed is formed orthogonal on the part where the end face part P and the external diameter part Q intersect. In the respective figures, the parts shown by the reference symbols P, Q, and M, are chip produced by the cutting of the end face part P, the external diameter part Q, and the chamfered part M. However, in FIG. 23, the chip of the end face part P and the chamfered part M are shown combined together. The material of the work W as this time was S45C material, the cutting speed was 170 m/min, and wet cutting was applied. Here, regarding the insert of the first and the second comparative examples, the land angle was 6° and the rake angle was 22°, being constant around the entire periphery of the rake face respectively. On the insert of the first comparative example where the chip of FIG. 24 was produced, the sub convex 9 was not formed. On the other hand, on the insert of the second comparative example where the chip of FIG. 25 was produce, the sub convex being a large convex spherical face shape having a radius of 1.5 mm (11.8% of the diameter of the circle inscribed) was formed, similarly to the first embodiment, with the center at a position where the distance L from the tip of the corner part C (27.6% of the diameter of the circle inscribed) was 3.5 mm. The other parts of the first and the second comparative examples were the same in shape and size as those of the first embodiment. Therefore, from these drawings, it becomes clear that, compared to the insert of the first and the second comparative examples where the chip was broken, and chip having partially irregular curls and stretched in strips was produced, chip having superior curls was obtained by the insert of the first embodiment according to the present invention.

Figure 27:
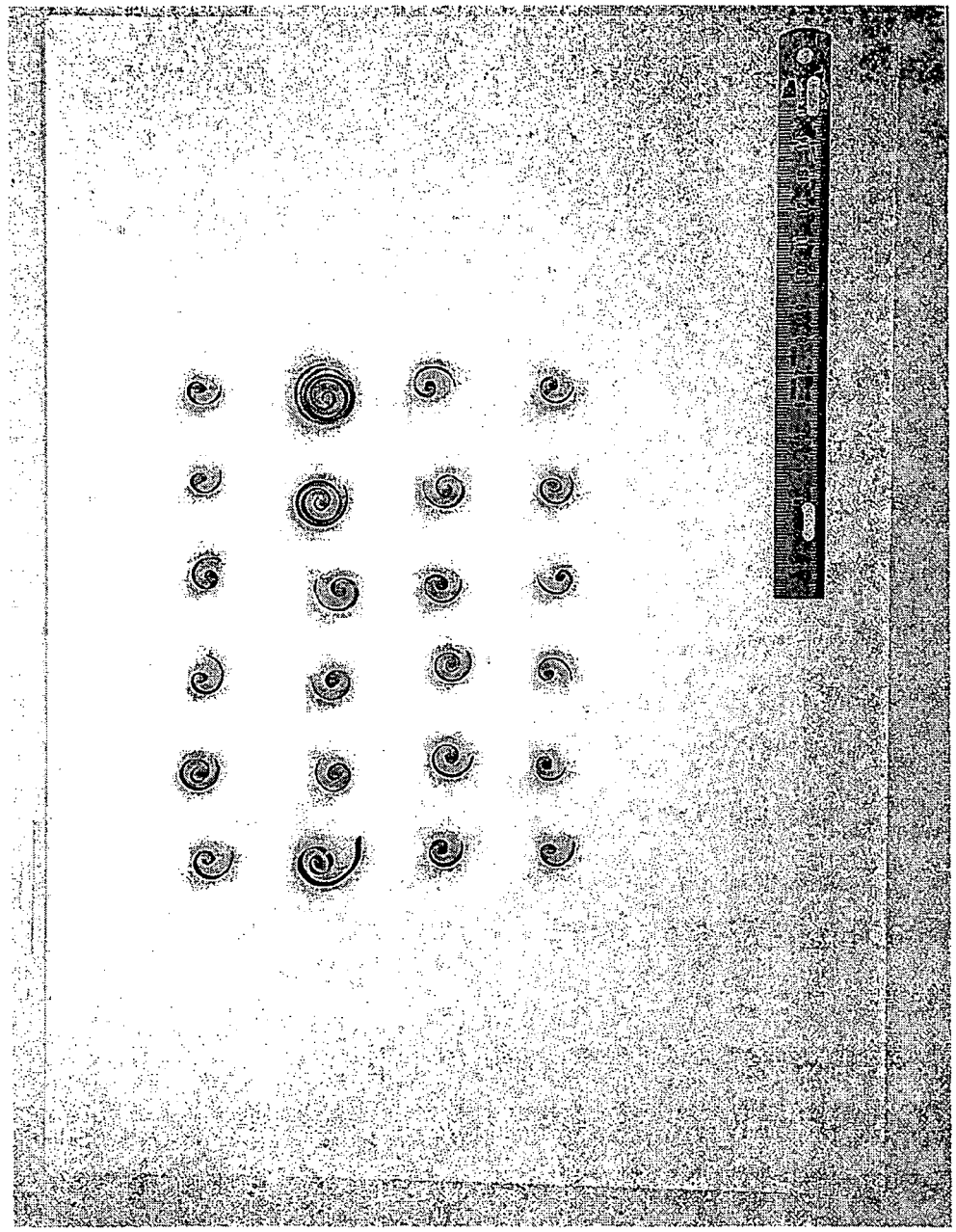
FIG. 27 shows chip when cutting a rounded part of the work W according to the first embodiment of the present invention.
Figure 29:
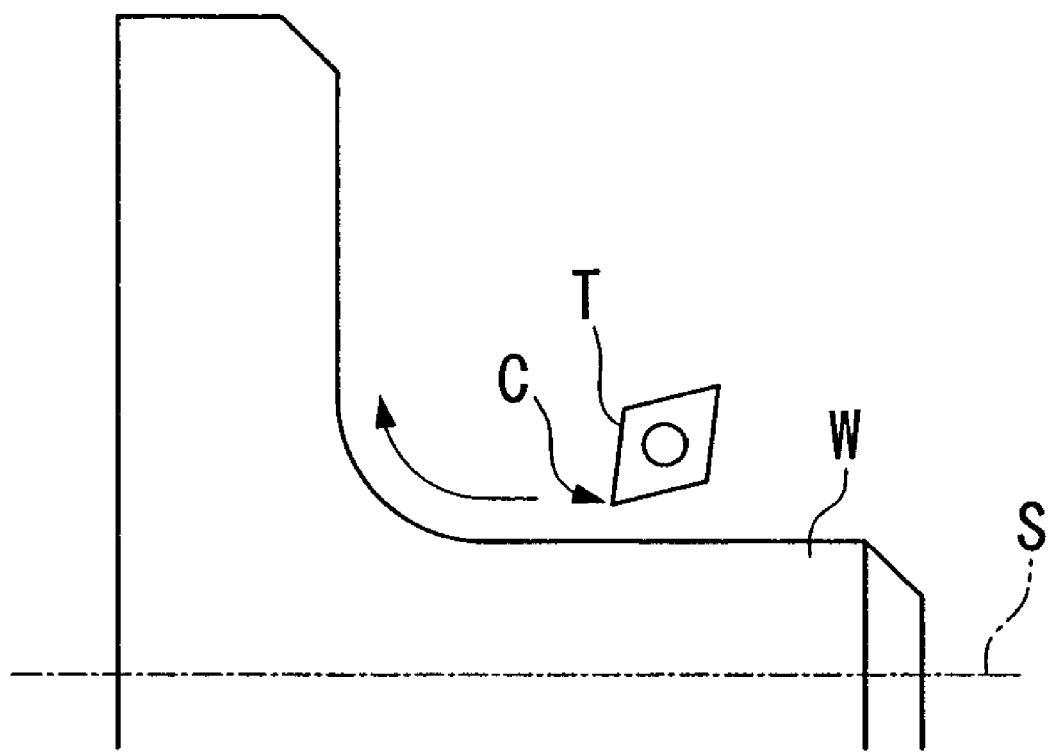
FIG. 29 shows an example of profile turning.

Next, FIG. 27 shows the shape of chip due to the insert of the first embodiment similarly to the above, and FIG. 28 shows the shape of chip due to the insert of the first comparative example of the two comparative examples, for when as shown in FIG. 29, cutting a rounded part between the external diameter part and the end face part of the work W. The feed rate was 0.25 mm/rev, the depth of cut was 0.8 to 3.5 mm, the work material was S50C or equivalent, and wet cutting was applied. As a result, as shown in FIG. 27 and FIG. 28, chip could not be broken by the insert in the first comparative example and the length became 30 cm or more, while superior chip breaking was obtained by the insert of the first embodiment.

INDUSTRIAL APPLICABILITY

As described above, in the present invention, when narrow chip is produced on the tip of the corner part of the cutting edge, this chip is guided to the trough formed by the land and the rake face, flows out, is made collide with the main convex being the convex spherical face shape formed on the tip of the corner part on the rake face, and is made curled. On the other hand, even when wide chip is produced using a cutting edge of a certain length from the corner part C, the land angle of the rake face is made smaller in the direction extending from the tip of the corner part to the cutting edge so that the chip is curled in the width direction, and produced so as to be readily broken in the outflow direction. Both end parts in the width direction of such chip collide with the main convex and the sub convex and are curled in the outflow direction so that it can be readily broken. Therefore, according to the present invention, chip control can be reliably performed irrespective of the width or the outflow direction of the chip. Particularly, superior chip control performance can be demonstrated when used in profile turning where the width or the outflow direction of the chip sequentially changes, and twisting of the chip and an increase in cutting resistance can be prevented, so that it becomes possible to perform smooth and stable chip control.

The invention claimed is:

1. An indexable insert comprising:
an insert having a polygon face in a polygonal plate shape;
a pair of cutting edges intersecting at corner parts of the polygon face and extending respectively therefrom, and formed on a ridge part of the polygon face;
rake faces formed on the polygon face, gradually inclining away from the cutting edge, the angle of inclination thereof becoming smaller as the rake face extends away from the tip of the corner part along the cutting edge;
a land formed along the cutting edge, inclining gradually to sink away from the cutting edge at an angle of inclination smaller than the angle of inclination of the rake face, the angle of inclination thereof becoming smaller as the land extends away from a tip of the corner part along the cutting edge;
at least one main convex being a convex spherical face shape and formed away from the cutting edges on the rake faces, on the corner part; and
at least one pair of sub convexes being a convex spherical face shape and formed respectively at positions further away from the corner parts than the main convex on the rake faces, along the pair of cutting edges.

2. An indexable insert according to claim 1, wherein one of the main convexes is formed on a tip side on the corner part of the rake face, and a radius of the convex spherical face formed by the main convex is larger than a radius of the convex spherical face formed by the sub convex, and a height of a highest point of the main convex in a thickness direction of the insert is higher than a highest point of the sub convex.

3. An indexable insert according to claim 2, wherein a radius of the convex spherical face formed by the main convex is within a range between 10% and 26% of a diameter of a circle inscribed within the polygon face where the rake faces are formed.

4. An indexable insert according to claim 2, wherein a difference in height between a highest point of the main convex in a thickness direction of the insert and a highest point of the sub convex is within a range between 0.02 mm and 0.12 mm.

5. An indexable insert according to claim 1, wherein two of the main convexes are formed on the corner part on the rake face in a direction across the corner part, so that radii of the convex spherical faces formed by the main convexes are mutually equal, and substantially equal to the convex spherical faces formed by the sub convexes, and so that a height of a highest point of the main convex in a thickness direction of the insert is also substantially equal to a height of a highest point of the sub convex.

6. An indexable insert according to claim 1, wherein a radius of the convex spherical face formed by the sub convex is within a range between 3.0% and 6.5% of the diameter of a circle inscribed within the polygon face where the rake faces are formed.

7. An indexable insert according to claim 1, wherein, in a plan view facing the rake face, a distance between a central position of one of the convex spherical faces formed by a first pair of sub convexes from the tip of the corner part and the tip of the corner part, which is measured in a direction along the cutting edge adjacent to the sub convex, is set within a range of between 15% and 40% of the diameter of the circle inscribed on the polygon face where the rake face is formed.

8. An indexable insert according to claim 1, further comprising:
on each of the rake faces, in a plan view facing this rake face, a projecting breaker extending to an inside of the rake face from the main convex, a height of the breaker in a thickness direction of the insert being higher than a height of a highest point of the main convex and the sub convexes.

9. An indexable insert according to claim 8, further comprising:
a step part, which becomes convex towards an outside of the rake face partway towards this rake face being formed on a wall of the breaker, the wall extending from the apex of the breaker as viewed in the thickness direction of the insert to the rake face.

10. An indexable insert according to claim 1, wherein the angle of inclination of the land is within a range between 2° and 15° at the tip of the corner part, and is 12° or less at a central position of the sub convex adjacent to the main convex, and a difference between the angles of inclination of the rake and the land is within a range between 10° and 20°.

11. An index able insert comprising:
an insert having a polygon face;
rake faces formed on the polygon face;
a pair of cutting edges intersecting at corner parts of the polygon face and extending respectively therefrom and formed on a ridge part of the polygon that forms the rake faces;

a land formed along the cutting edge;

at least one main convex being a convex spherical face shape and formed away from the cutting edges on the rake faces, on the corner part;

at least one pair of sub convexes being a convex spherical face shape and formed respectively at positions further away from the corner parts than the main convex on the rake faces, along the pair of cutting edges;

a projecting breaker on each of the rake faces, extending from the main convex to an inside of the rake face; and a step part which becomes convex towards an outside of the rake partway towards this rake face, being formed on a wall of the breaker, the wall extending from the apex of the breaker as viewed in the thickness direction of the insert to the rake face.

12. An indexable insert according to claim 11, wherein each of the rake faces gradually inclines away from the cutting edge, the land inclines gradually to sink away from the cutting edge at an angle of inclination smaller than the angle of inclination of the rake face, and the angles of inclination of the rake face and the land become smaller as the rake face and the land extend away from a tip of the corner part along the cutting edge.

13. An indexable insert according to claim 11, wherein a height of the breaker in a thickness direction of the insert is higher than a height of a highest point of the main convex and the sub convexes.

14. An indexable insert according to claim 11, wherein the main convex is formed on a tip side on the corner part of the rake face, and a radius of the convex spherical face formed by the main convex is larger than a radius of the convex spherical face formed by the sub convex, and a height of a highest point of the main convex in a thickness direction of the insert is higher than a highest point of the sub convex.

15. An indexable insert according to claim 14, wherein a radius of the convex spherical face formed by the main convex is within a range between 10% and 26% of a diameter of a circle inscribed within the polygon face where the rake faces are formed.

16. An indexable insert according to claim 14, wherein a difference in height between a highest point of the main convex in a thickness direction of the insert and a highest point of the sub convex is within a range between 0.02 mm and 0.12 mm.

17. An indexable insert according to claim 11, wherein a pair of main convexes are formed on the corner part on the rake face in a direction across the corner part, so that a radii of the convex spherical faces formed by the main convexes are mutually equal, and substantially equal to the convex spherical faces formed by the sub convexes, and so that a height of a highest point of the main convex in a thickness direction of the insert is also substantially equal to a height of a highest point of the sub convex.

18. An indexable insert according to claim 11, wherein a radius of the convex spherical face formed by the sub convex is within a range between 3.0% and 6.5% of the diameter of a circle inscribed within the polygon face where the rake faces are formed.

19. An indexable insert according to claim 11, wherein, in a plan view facing the rake face, a distance between a central position of one of the convex spherical faces formed by a first pair of sub convexes from the tip of the corner part and the tip of the corner part, which is measured in a direction along the cutting edge adjacent to the sub convex, is set within a range of between 15% and 40% of the diameter of the circle inscribed on the polygon face where the rake faces are formed.

* * * * *